(12) United States Patent
Mack et al.

(10) Patent No.: US 10,387,821 B2
(45) Date of Patent: *Aug. 20, 2019

(54) QUANTITATIVE METRICS FOR ASSESSING STATUS OF A PLATFORM ARCHITECTURE FOR CLOUD COMPUTING

(71) Applicant: SALESFORCE.COM, INC., San Francisco, CA (US)

(72) Inventors: Gerhard Friedrich Mack, Hamburg (DE); Stefan Pühl, Langen (DE)

(73) Assignee: SALESFORCE.COM, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/029,883

(22) Filed: Jul. 9, 2018

(65) Prior Publication Data

US 2018/0330290 A1  Nov. 15, 2018

Related U.S. Application Data

(63) Continuation of application No. 14/841,395, filed on Aug. 31, 2015, now Pat. No. 10,049,337.

(51) Int. Cl.
*G06F 9/44* (2018.01)
*G06Q 10/06* (2012.01)
*H04L 12/24* (2006.01)

(52) U.S. Cl.
CPC ....... *G06Q 10/067* (2013.01); *G06Q 10/0637* (2013.01); *H04L 41/0893* (2013.01)

(58) Field of Classification Search
CPC ........................................... G06F 9/44

USPC ................................................ 717/101–108
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

Systems and Software Engineering—Architecture Description; International Standard ISO/IEC/IEEE 42010; First Edition Dec. 1, 2011; 46 pages.

(Continued)

*Primary Examiner* — Jae U Jeon
(74) *Attorney, Agent, or Firm* — Schwabe Williamson & Wyatt

(57) ABSTRACT

One or more implementations relate generally to a platform architecture planning process utilizing architecture type unit definitions. For example, an architecture for realizing a customer system on a cloud computing platform may be defined in terms of a plurality of architecture types, each type (AT) defined by plural architecture type units (ATUs), and each ATU comprising a set of ATU Details.

20 Claims, 21 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherphier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,503,483 B2 | 10/2009 | Psounis et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,930,321 B2 | 4/2011 | Schimmel |
| 7,945,653 B2 | 5/2011 | Zukerberg et al. |
| 8,005,896 B2 | 8/2011 | Cheah |
| 8,010,584 B1 | 8/2011 | Craver et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,122,426 B2 | 2/2012 | Isom |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0027455 A1 | 10/2001 | Abulleil et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0126562 A1* | 7/2003 | Hamlin .................. G06N 3/126 716/102 |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0098154 A1 | 5/2004 | McCarthy |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |

(56) References Cited

U.S. PATENT DOCUMENTS

| | | |
|---|---|---|
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0059253 A1* | 3/2006 | Goodman .............. G06Q 10/10 709/223 |
| 2006/0117012 A1 | 6/2006 | Rizzolo et al. |
| 2007/0050198 A1 | 3/2007 | Ledford et al. |
| 2008/0046299 A1 | 2/2008 | Simons et al. |
| 2008/0148220 A1 | 6/2008 | Tabaru et al. |
| 2008/0249972 A1 | 10/2008 | Dillon |
| 2008/0263506 A1 | 10/2008 | Broadfoot et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0222481 A1* | 9/2009 | Fisher .................... G06Q 10/06 |
| 2009/0319313 A1 | 12/2009 | Subash et al. |
| 2010/0299650 A1* | 11/2010 | Abrahamsen .......... G06Q 10/10 717/102 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0109699 A1 | 5/2012 | Hatfield |
| 2012/0159441 A1 | 6/2012 | Ghaisas |
| 2012/0233137 A1 | 9/2012 | Jakobson et al. |
| 2012/0290407 A1 | 11/2012 | Hubbard et al. |
| 2013/0055252 A1* | 2/2013 | Lagar-Cavilla ....... G06F 9/5016 718/1 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0232463 A1 | 9/2013 | Nagaraja |
| 2013/0232498 A1 | 9/2013 | Mangtani et al. |
| 2013/0247216 A1 | 9/2013 | Cinarkaya |
| 2014/0164486 A1 | 6/2014 | Ravichandran |
| 2014/0359537 A1 | 12/2014 | Jackobson et al. |
| 2015/0341240 A1 | 11/2015 | Iyoob |

OTHER PUBLICATIONS

The 3rd Platform: Enabling Digital Transformation; Sponsored by: Tata Consultancy Services (TCS), Digital Software & Solutions Group; Frank Gens; Nov. 2013; 13 pages.

Listing of Related Cases; Jul. 9, 2018, 1 page.

\* cited by examiner

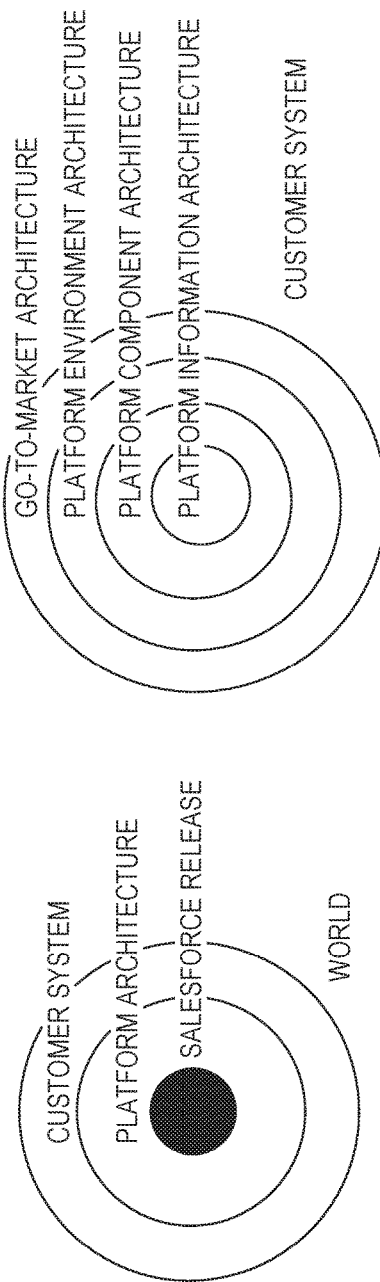
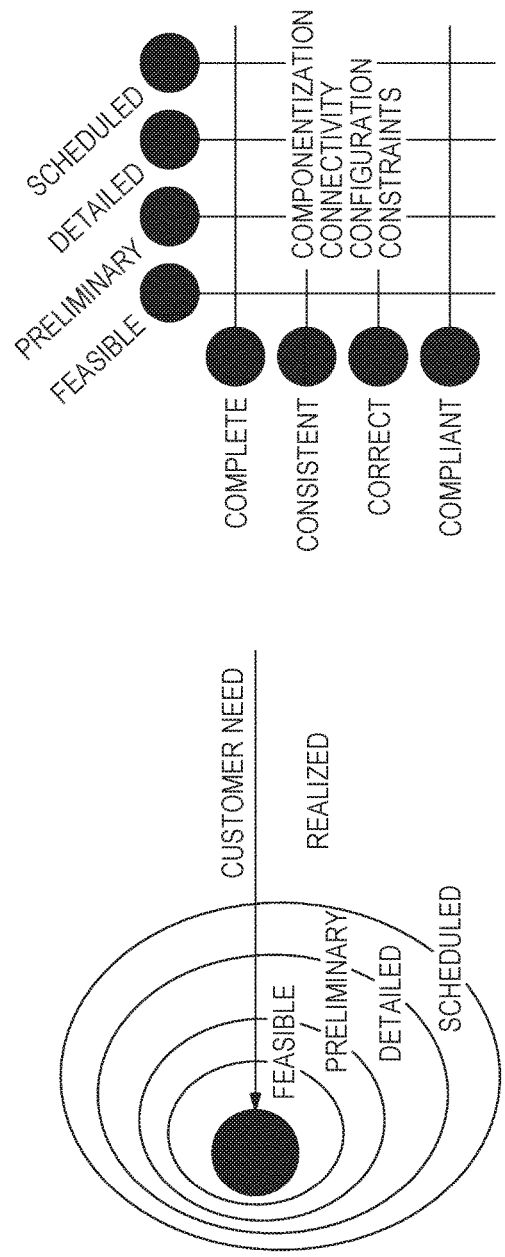

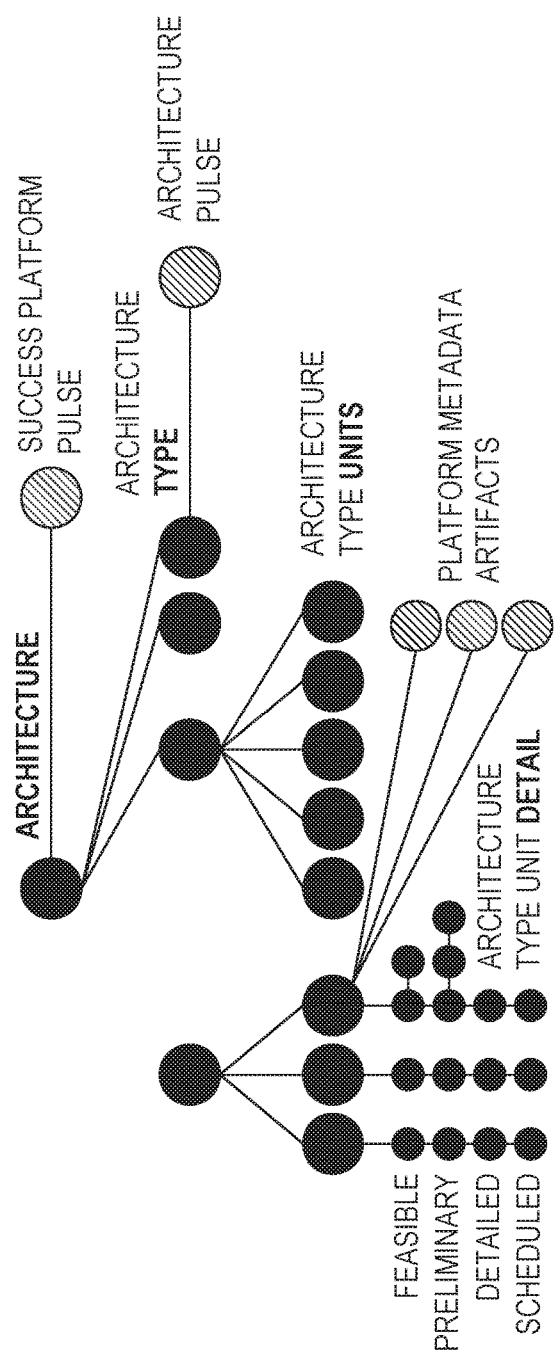

1100

Components to manage main Architecture Types

1400

System applying provided knowledge artifacts

1600

System to create Platform Pulse

Method for Measuring the Architecting of a Customer System

| GTMA AM | Feasible | Preliminary | Detailed | Scheduled |
|---|---|---|---|---|
| Complete | 1 | 1 | 0 | 0 |
| Consistent | 1 | 1 | 1 | 1 |
| Correct | 1 | 1 | 1 | 1 |
| Compliant | 0 | 0 | 0 | 0 |

| GTMA PULSE | 0,69 |
|---|---|

QUANTITATIVE METRICS FOR ASSESSING STATUS OF A PLATFORM ARCHITECTURE FOR CLOUD COMPUTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is a continuation of, and claims priority to, U.S. patent application Ser. No. 14/841,395 entitled "QUANTITATIVE METRICS FOR ASSESSING STATUS OF A PLATFORM ARCHITECTURE FOR CLOUD COMPUTING" and filed Aug. 31, 2015, the contents of which are incorporated by reference herein in their entirety.

The following commonly owned, co-pending non-provisional United States Patents and Patent Applications, including the present application, may be related to each other. Each of the other patents/applications are incorporated by reference herein in their entirety: U.S. patent application Ser. No. 14/840,778, entitled, PLATFORM PROVIDER ARCHITECTURE CREATION UTILIZING PLATFORM ARCHITECTURE TYPE UNIT DEFINITIONS, filed Aug. 31, 2015; and U.S. patent application Ser. No. 14/840,957, entitled, PLATFORM ARCHITECTURE PLANNING PROCESS UTILIZING PLATFORM ARCHITECTURE TYPE UNIT DEFINITIONS, filed Aug. 31, 2015.

FIELD OF THE INVENTION

One or more implementations relate generally to a platform architecture planning process utilizing architecture type unit definitions.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The ANSI/IEEE Standard 1471-2000 "Recommended Practice for Architectural Description" states: Conceptually, an IT architecture is the fundamental organization of a system, embodied in its components, their relationships to each other and the environment, and the principles governing its design and evolution. Practically, it is represented in architectural descriptions from the viewpoints of the stakeholders. IT architecture often separates business support systems (BSS) and operational support systems (OSS) from enterprise resource planning (ERP) and customer relationship management (CRM).

BRIEF DESCRIPTION OF THE DRAWINGS

In the following drawings like reference numbers are used to refer to like elements. Although the following figures depict various examples, the one or more implementations are not limited to the examples depicted in the figures.

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 is a Venn diagram illustrating logical sets of the customer system and the platform architecture.

FIG. 4A is a diagram illustrating a relationship between four architecture types related to a customer system.

FIGS. 4B-C are diagrams illustrating a relationship between these four levels of detail

FIG. 7A is a tree diagram illustrating a relationship between architecture type, architecture type units (ATUs), and ATU details.

FIG. 20 illustrates an example of a non-optimal architecture marker for the GMTA.

FIG. 21 illustrates an example of a quality level weight matrix.

DETAILED DESCRIPTION

Figure 1A:
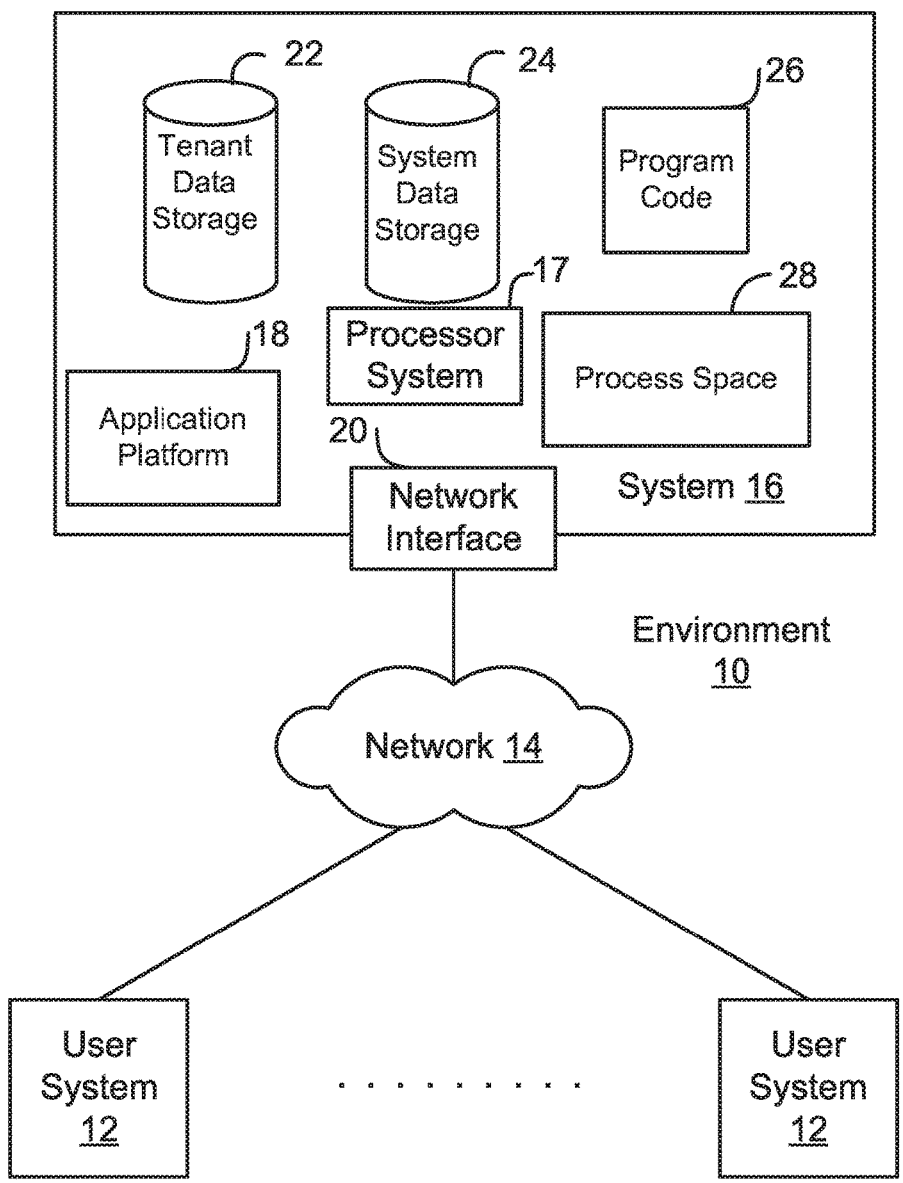
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for platform architecture planning process utilizing architecture type unit definitions.

A customer system may be introduced utilizing the preexisting cloud-computing platform, e.g. the Salesforce1 platform, and/or an existing customer system may be changed utilizing the preexisting cloud-computing platform, e.g. a component of an existing customer system may integrated with the preexisting cloud-computing platform. This introduction of customer system utilizing the preexisting cloud-computing platform may be architectured, i.e. a platform architecture may be defined. In an example, a method for developing a customer system utilizing a preexisting cloud-computing platform is provided. The method may include defining a platform architecture for the customer system to be developed in terms of a plurality of architecture types—and their predefined architecture type units. The method may include generating structured information arranged to evaluate a staggered resource deployment associated with planning resources to be allocated before a development cycle of the customer system. The method may include evaluating a first prospective planning resource deployment of the staggered resource deployment using scope screen information of the generated structured information, and evaluating a second prospective planning resource deployment using capability information, after a time of deployment of a planning resource corresponding to the first prospective planning resource deployment.

In some implementations, the method includes defining a platform architecture for the customer system (at least a portion of which may be to be developed according to the platform architecture) in terms of architecture types including a Go-To-Market Architecture (GTMA) type, a Platform Environment Architecture (PEA) type, a Platform Component Architecture (PCA) type, and a Platform Information Architecture (PIA) type. Each architecture type may be associated with Architecture Type Units (ATUs). In some implementations, the ATUs for a GTMA type may include at least one of a customer value view, a portfolio commercialization model, a customer contact model, an initial product backlog, a product increment approach, or a release stage model.

Each ATU may be associated with at least one grouping of ATU details (a grouping of ATU details includes at least one ATU detail). In some implementations, the number of groupings of ATU details may correspond to a number of discrete stages that correspond, respectively, to one level of a levels of details progressing from, for instance, feasible to scheduled (e.g. feasible, preliminary, detailed, scheduled).

In some implementations, a success gates may be applied to the platform architecture, e.g. to each architecture type, to determine whether to commit resources to development of the customer system. For instance, for each architecture type, a determination may be made whether an ATU detail is verified. The ATU detail may be of one of the groupings of ATU details based on a given success gate, to determine whether to execute the success gate. If the success gate is executed, an indicator for a go-no-go decision related to the allocation of resources may be displayed.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
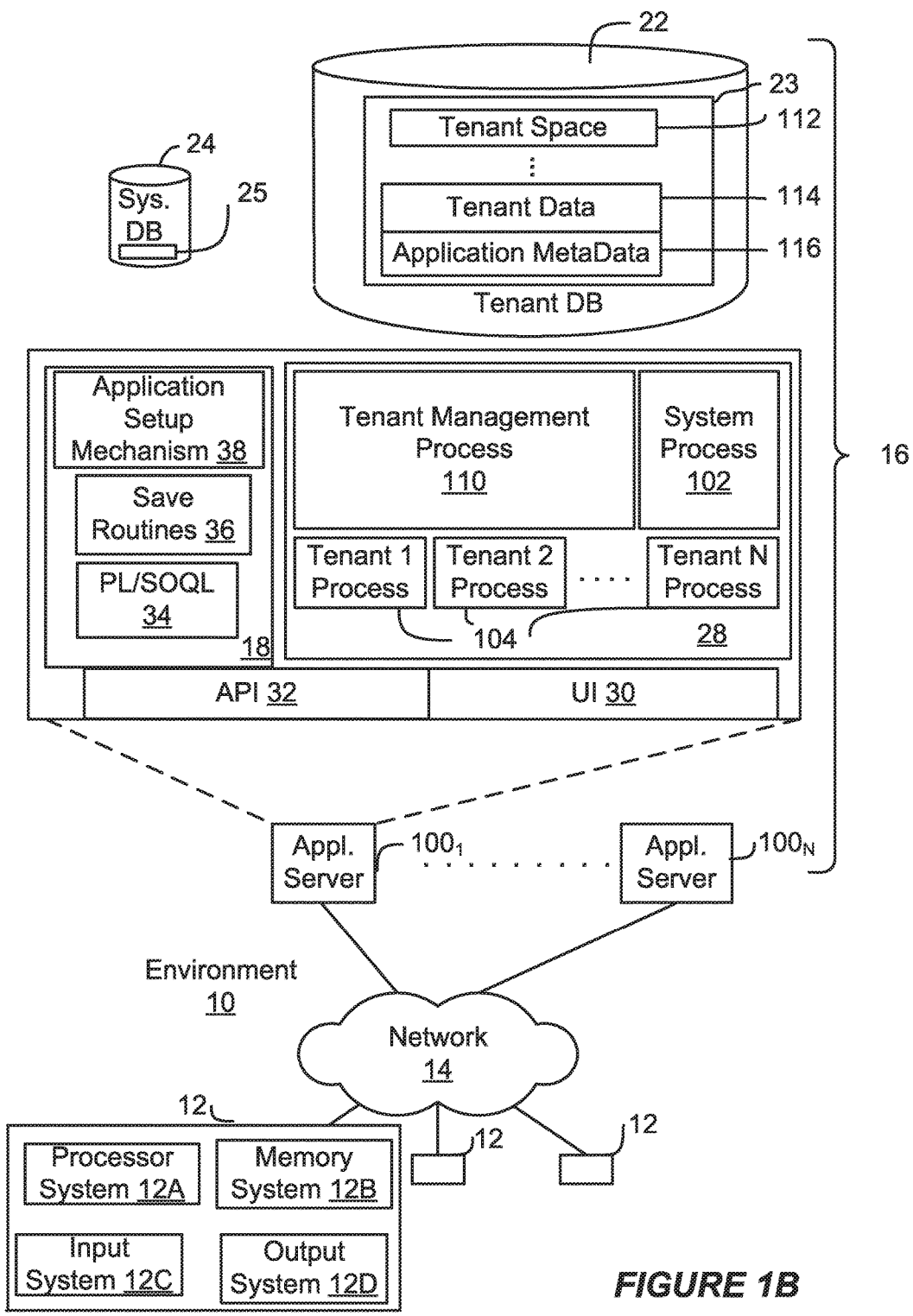
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 100₁-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100₁ can be coupled via the network 14 (for example, the Internet), another application server 100N-I can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more Structured Query Language (SQL) statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
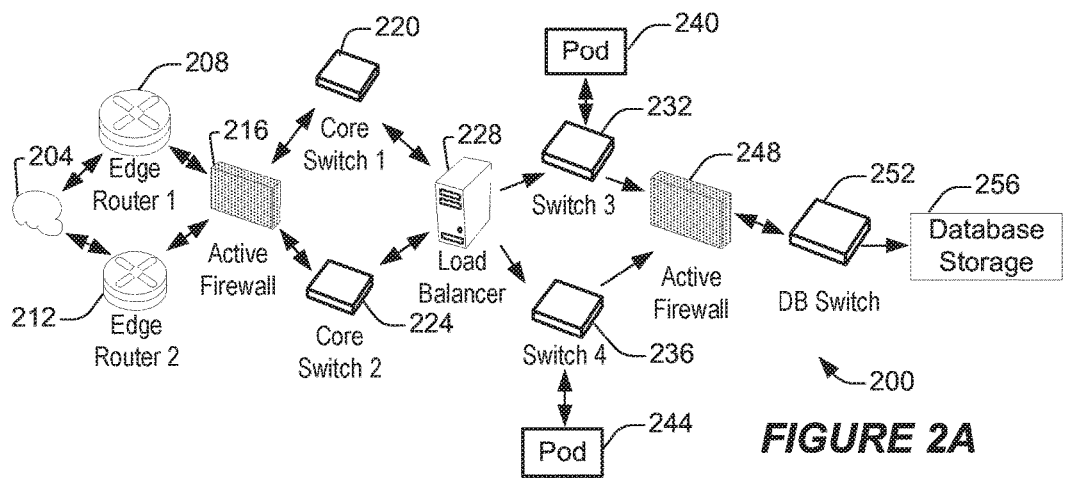
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
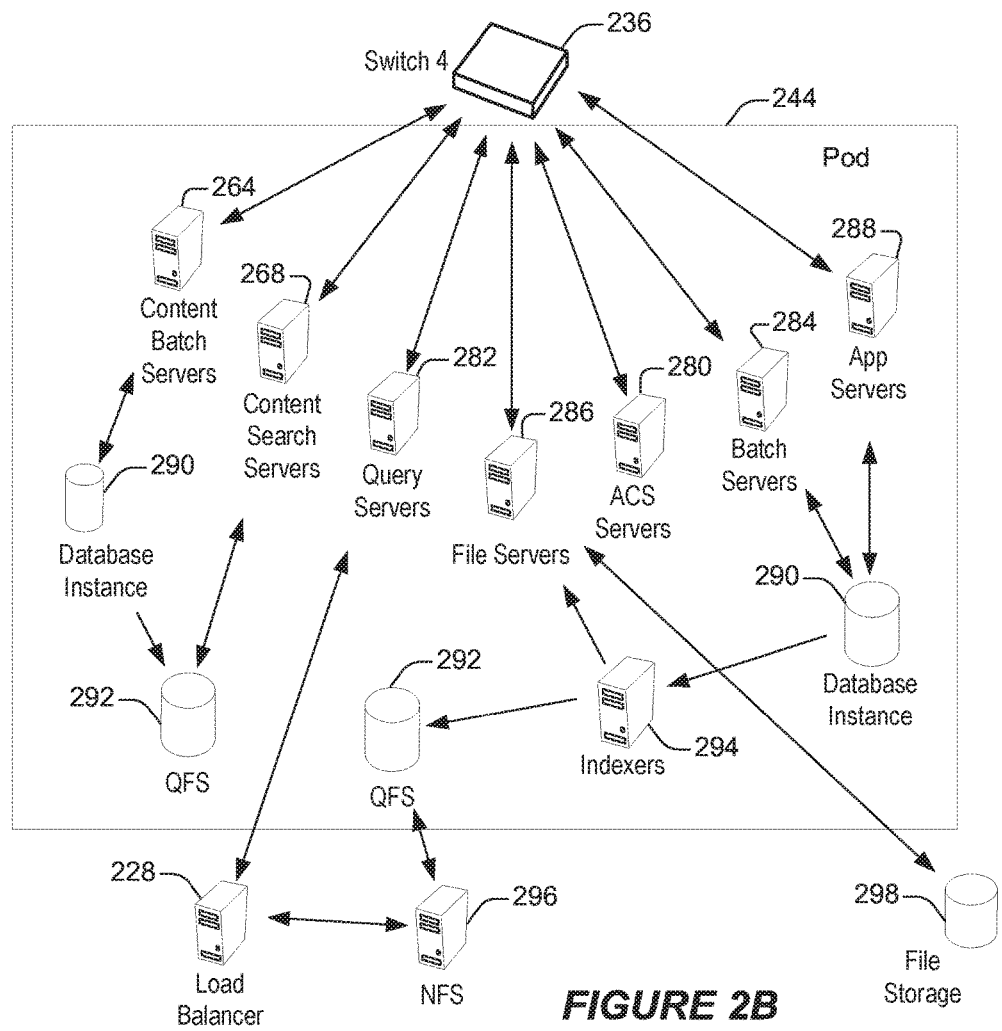
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Platform Provider Architecture Creation Utilizing Platform Architecture Type Unit Definitions Overview As a vendor we want to make architecture a non-issue to deliver value on our platform. Hence, it needs an embedded architecture process that leads to a design for value. Only a vendor measured by success and speed advocates such a process.

Everybody seems to talk about agility, speed as the new currency: quick time-to-value or fast time-to-market. Agile development is around for a while; new "agility layers" are built on top of old IT applications. But in an enterprise—introducing a common platform—it needs planning. How to cope with that? How to deal with systems of different speed?

A common language in the actual doing makes certain deviations visible as fast as the development of solutions expects it: stakeholders talk about the same artifacts, hence alternatives and decisions are more precise and better understood; artifacts are ideally created and confirmed at the right point in time of the project. Architecture is the enabler for agile development, not the documentation or doubtful duty of formal red tape. Hence, architecture is fast when most of it is implicit or can be pre-defined. Platforms mandate certain approaches because platforms have their own architecture, a solution architecture must respect and anticipate.

We believe in speed as the new currency to co-create value with our partners. We want to ensure visibility in a standardized process creating or assessing a Salesforce architecture that drives the Salesforce system realization in an enterprise. That standardized process shall work independently from the partner—and it should make partners comparable delivering the same results based on the given assets to produce. It makes the process foreseeable and predictable—between vendor and services (delivery, analysis, planning, etc.)

Salesforce customer architecture allows determining the right activities after the creation or assessment of a system. This can be a "cure" a fix of an existing system or the full plan to introduce a new system. Often, systems change substantially, and with such a standard process architecture goes with it.

We define architecture as the deliverables and associated capabilities to govern and to empower business-driven technology transformation, governance, and agile development to increase a defined value for the customers and to co-innovate. The architecture outcome of the platform value has go-to-market, environment, components, and information architecture types. The design outcome details customer requirements guided by architecture. Essentially, architecture is the ability to create a Salesforce system representation (model, description) and to assess a Salesforce system or its architectural description.

We define a platform as an organizational, centrally owned Salesforce instance or system of instances that enables apps for the internal organization and external customers and partners for a given purpose. The Salesforce platform has a built-in architecture, implicit decisions and structure given. A successful customer architecture leverages this and customizes the platform accordingly. That's why, we think as vendors we must contribute to the standardization of the activities to create and assess such an architecture, too.

Hence, the goal of the Salesforce success architecture method is to establish the Salesforce platform as the leading center of a customer system. We define a customer system as a system of connected business processes (e.g. sales, marketing, service, communities), data, and connected technology artifacts (hardware and software)—and its organizational model—that create customer success. The customer system has an external architecture e.g. including backend systems or external systems interacting with the central platform.

The method describes a path through the capabilities needed to create and to assess an architecture—to bridge strategy and realization with solid planning for control and empowerment. This path reflects the dependencies of the deliverables and capabilities. Program architects, enterprise architects, and solution architects will adopt the general method to tackle the core challenges customers have. The method focuses on the deliverable, the asset, and the outcome. It describes what needs to be achieved, not how or with what effort.

Organizational change happens with Salesforce—due to the unique development approach and our disruptive technology. Architecture drives this technological transformation. To enable this change this requires a strong commitment, i.e. management mandate, by corporate leaders to communicate this change within the company. Organizational aspects like a Center of Excellence (CoE) as a governance body for architecture methodology is a separate task that we do not address in this architecture method.

We position this method for a center of excellence, chief architects, CIOs, or COOs in an organization to lead that kind of combined business-technology transformation a (in our case: customer system) frame of reference—normally called architecture: in our case the customer architecture. Consequently, the strict borders between technology departments and business departments will be not as important as they were in the past. Architecture translates strategy into planning. It allows specialized architects to contribute at the right place.

Support may use an architectural aggregation and health indicators as an online assessed system to derive certain actions to improve the overall system. Pre-sales may use the method to structure responses to position customer solution and e.g. show the unique selling point of accelerators.

This allows empowering and governing partners and owners—working on the platform in customer engagements or product developments: it allows managing value co-creation in accounts. The architecture process consists of success gates defined with architecture and design outcome at the appropriate level of detail. (Tooling will support such an approach, like a sales process or a support process we may track progress.)

It will define a possible work split to combine standardized service offerings (known as accelerators) with customized statement-of-work activities. This offers a defined work split between different individuals and teams having different skills. It allows managing these contributions of different sources to deliver one successful customer platform at the very end. We want to make the development a "service" (exceptions may apply), because we have a predefined architecture system (structure) due to the Salesforce platform including an associated architecture process due to this method formalized. Knowing exactly what needs to be done, demand the exact capabilities needed to achieve it. Hence, work split is easier—will be possible.

The method articulates where to start where to end with what level of quality: this is what we mean by outcome driven standardization. This needs product expertise (we assume exists) and methodology expertise we describe here. Each contributor and manager can expect defined outcome of work she or he depends on—to be successful; and provides it in such a way, even if they are coming from different internal or external organizations or embedded into "pre-caned" assets or service offerings.

Besides allowing a work split between architects it plans what needs to be done by delivery partners. The selection of these delivery partners based on their proposed outcome—standardized to work as seamlessly together as possible—will be much easier, talking the same language and asking for defined outcome, not rate cards, skills, reputation, or resumes. It focuses on continuous delivery on the platform; architecture has to adapt to changing platform apps and channels, robust value-add platform services (vendor and custom specific), and stable backend integration.

The method is industries agnostic. We have a common architectural language that can be used to articulate vertical specifications, e.g. an object model or industry specific success journeys. The method can structure vertical reference architectures.

"This is the Salesforce Way of doing things." we want to say. We want to describe the way of success: that our partners or customers can walk the (=our) talk in the given frame of reference. We want to contribute to the simple fact—besides certified product knowledge—that a defined approach will more likely generate defined outcome. It is repeatable—and based on the repeated work of a lot of practitioners having done it before. It is comparable because of the defined structure. It allows orientation and enables communication—for the activities needed to make a Salesforce system successful, and all stakeholders for towards that. It is actionable due to explicit decomposition of what needs to be achieved, and hence articulates the skills and capabilities needed. It is the Newton thing: "Standing on the shoulders of giants".

Steering Successful Transformation and Governance—the Method

The Salesforce Success Architecture Method (SAM)—with its customer success platform architecture process—creates or is assessing a particular cloud architecture to control success and to empower a valuable initial portfolio product backlog or additional portfolio or product changes.

A custom architecture places the customer in the center of a unifying platform to execute customer journeys and connects it with all relevant services and systems over the Internet to innovate and to succeed with digital business processes. The architecture can be combining development and operations into one organization. A Salesforce customer architecture includes all Salesforce products relevant to the needed customer value and its connected systems and devices. The customer architecture describes the customer system.

Business architecture versus technology architecture is a common distinction. We describe a combination of both in one customer architecture that is leveraging the technological architecture given of the Salesforce platform and its functional system features.

Architecture's main value and purpose of existence (as additional effort) is the guiding frame of reference for any transformational change, including agile development of applications and the introduction of new applications. Architecture is stable to assess, to create change, and to govern change. We see applications (and their associated devices, i.e. hardware) here as products—either purchased, developed, or customized. Portfolios group products on the platform. Business-driven application development is increasingly fragmented; the decomposition and coordination is part of the architectural frame of reference.

Architecture Strategy and Design Methodology for Innovation—Transformation, Governance, Management, and Engineering for Value Co-Creation We are asked for introducing or changing a customer system with a Salesforce platform; transformation happens with a lot of questions: What does change? Where do we start? Where to end? What is the impact of cloud? Is it for what part of the organization? What will go away (what is not needed)? What will be added? What will be morphed? Are there new products, new devices? Is connectivity given? Is integration given? And so on . . . value? roles?

A system can be defined as a collection of different things which together produce results unachievable by the elements alone. "(The) . . . "system functions" derive almost solely from the interrelationships among the elements, a fact that largely determines the technical role and principal responsibilities of the systems architect." No one buys a system to own the system, they buy it to own what it does. The architecture must be grounded in this customer's purpose: the customer owning it—and the customer of the customer using it.

The ANSI/IEEE Standard 1471-2000 "Recommended Practice for Architectural Description" states: Conceptually, an IT architecture is the fundamental organization of a system, embodied in its components, their relationships to each other and the environment, and the principles governing its design and evolution. Practically, it is represented in architectural descriptions from the viewpoints of the stakeholders. IT architecture often separates business support systems (BSS) and operational support systems (OSS) from enterprise resource planning (ERP) and customer relationship management (CRM).

We distinguish (1) the overall customer architecture and customer design—overseeing the whole customer system with all its devices and systems (in general CRM, ERP, BSS, and OSS) needed for customer success and (2) the platform architecture and design of the Salesforce instance or connected set of instances. The platform is customized for the customer system's purpose given. This method reflects the impact on the platform architecture based on a customer architecture. The method focuses on the Salesforce platform—promoting customer centricity.

The architecture is driven by one viewpoint: the customer. To achieve customer centricity the customer—or the different types of customers, often called personas—description is key: the value the customer has within the system is determining metrics.

The platform architecture has customer specific products, customer specific common or general platform services—based on the selected Salesforce cloud edition. A platform architecture in a customer system enables products reflecting the componentization, connectivity, configuration, and constraints of the system.

These products can depend on different sources. Products on a platform combine apps (software) and devices (hardware). Devices are connected to the platform: apps may have the platform as a source or the device as a source, e.g. a mobile device has an app connected to the platform for additional value-add services. Products may include additional, connected devices, e.g. a car head unit or house door opener. Hence, different product components may sit on different devices or the platform within a customer system. The platform, their apps and devices may impose constraints and configuration means combined.

On a high level the classical product life cycle may relate to architectural aspects like this:

TABLE 1

Product lifecycle stages and architecture artifact aspects

| Product Lifecycle Stages | Architecture Artifact Aspects |
|---|---|
| Proof of concept (P1) | Componentization, e.g. objects and journeys |
| Proof of market (P2) | Connectivity, e.g. services and back end systems |
| Proof of product (P3) | Configuration, e.g. maintainability and adoption |
| Proof of scale (P4) | Constraints e.g. platform limits or geographies |

The work split or progress detail level is discrete for our method—feasible, preliminary, detailed, scheduled—to define handovers and foster co-creation of value. Customer architecture is fast paced over generally applicable.

The quality dimensions or quality types to accomplish are: complete, consistent, correct, and compliant artifacts—to reduce rework and foster actionable agreement.

This is the way we describe the architecture of a customer system. This combines architecture analysis and assessment (quality of the architecture and the description of the architecture, architecture artifacts) and architecture conceptualization and creation (the level detail of the architecture and its architectural artifacts), e.g. do I have feasible completeness of componentization for the platform of my customer system?

Governance focuses on (1) continuous learning, enablement, and capability definition for decision empowerment and execution, and (2) success gates, to control the visibility and results of the process to make informed decisions. The planning focused gates address scope, capability, and development readiness. We enable the capability definition with architectural artifacts. A capability is the ability to create a defined artifact in the appropriate quality.

Engineering and management is addressed for planning using architecture to derive the needed actions; the agile development and commercialization approach is assumed.

A product can be an external product for customers to use or internal products used by employees. Architecture is always based on a customer system purpose. Design of the customer system and the architecture of the platform is often done in parallel. Hence, the architecture is supporting the set of products on the platform, the (business) product portfolio.

A platform supports a set of products; hence, the platform portfolio of products is managed by the platform architecture of the customer system. The method focuses on the central platform and its customer system to deliver customer centricity. Explicitly, we don't combine enterprise architecture management with agile development, e.g. TOGAF with Scrum. We focus on products consumed by customers and delivered by customers in one system on a central platform. FIG. 3 is a Venn diagram illustrating logical sets of the customer system and the platform architecture.

The product backlog impacts the platform architecture. Normally, an initial product backlog has proof points associated with a certain artifact focus. A customer can own multiple customer systems if needed on the same platform or on separate platforms (different instances of Salesforce managed together or in isolation)—depending on the organizational model of the enterprise and the purpose of the customer system itself.

Risk—as impact and probability—will introduce contingency and mitigation for the planning, programs, and projects of products to manage the overall portfolio on the platform. Architecture aspects normally structure the risk management accordingly: what if components cannot be decoupled? What if components will not come at all, or are delayed? What if connectivity between components cannot be established, what if connectivity is reduced? What if configuration of connectivity and components is not flexible as needed or hampered? What if constraints limit configuration, connectivity, or components?

Architecture and design are illustrated by a running prototype—as an illustration of the concept, product or version 0 (start of an evolving systems). This prototype often starts with a demo. The first sprints may focus on functionality, their components to illustrate the concept (P1) while keeping the other stages in mind—but realizing these when needed.

Architecture Success

Architecture success, maturity, service excellence, or delivery progress—the understanding where do I place an action, a service offering, a fix, a review, an audit—is based on the combination of creation and assessment, e.g. I have to reach detailed consistency or scheduled compliance. These activities can be predefined based on the customer success architecture; often they are called accelerators or service offerings. Partners may position themselves to deliver such standardization—besides new platform functionality.

We use the architecture view of the customer using the systems as the primary and leading principle of creating and assessing a system architecture. Consequently, we focus on the following impact regarding the overall enterprise process moving from strategy to concrete planning—considering business, services, processes, and data.

TABLE 2

Platform process and Architecture focus - action area

| Platform process | Architecture focus - action area |
| --- | --- |
| Transformation | Feasible, preliminary - assessment (to determine the goal) |
| Governance | Correct, compliant - assessment (to agree on the way) |
| Engineering | Complete, consistent - creation (to ensure realization) |
| Management | Detailed, scheduled - creation (to allocate resources) |

Hence, we do not create a RACI matrix for architects—but focus on the success articulated in architecture deliverables and their associated capabilities. An architectural framework is a tool for creating a broad range of an architectures and assessing or evaluating of different architectures, or selecting the right architecture for an organization. This is we want to present: a customer system architecture framework that is the underlying structure for the method that puts customer success first.

Heuristics are codified succinct expressions from lessons learned through your own or other's experience. Heuristics are a key tool of the architect: Success comes from wisdom. Wisdom comes from experience. Experience comes from mistakes. We put our Salesforce experience in an approach. This is our way of having an architecture method that is grounded in practical, operational advice. The method will evolve—as we gain more experience into how customer systems are defined and how this method will give visibility into these.

We separate architecture from design. Success architecture supports the planning to steer the development and commercialization process—and align these with the overall strategy.

The customer system architecture may be based on the platform structure used, e.g. described by platform architecture artifacts, such as guidelines, models, maps, and views, or the like, or combinations thereof. A non-limiting list of examples of platform architecture artifacts includes ER diagram (object model)—including external objects, cloud licenses (sales, marketing, analytics, communities), customer success journey (process, maps, domains), layout usability driven (pages, etc.), analytics, user profiles (authorization), and API documentation.

The design may be based on the information design, e.g. documented by design artifacts, such as descriptions, diagrams, and the like, or combinations thereof. A non-limiting list of examples of design artifacts includes user stories of success journeys, components, customer epic, pages UX, connectors, customer story, user story, customer story design considerations (Visualforce, Apex). Regulatory requirements may be associated with architecture and design artifacts.

Customer System Architecture Framework: Method Principles

We rely on some general statements that summarize the method's intentions and are based on the architecture strategy we outlined:

1. Architecture is always done for a defined customer purpose owning the system.
2. The architecture view of the customer leveraging the system is the leading guideline.
3. The architecture process is iterative and has always defined levels of detail.
4. Architecture governance and its process visibility are based on success gates.
5. Architecture creation is a prerequisite for design.
6. Trust is our number one value; security is achieved by architecture and by design.
7. Licenses frame the cloud architecture creation.
8. The Salesforce development lifecycle is agile.
9. Releases are created from sprints or iterations.
10. Releases deliver at least a minimal valuable product.
11. Architectural artifacts are detailed during the creation and start by or with the initial customer commitment.
12. All required journeys have traceability: value to decision to component to regulatory request.
13. Implementation requirements (user stories) are derived from customer success journeys.

Platform Architecture Framework as a Core of the Customer Architecture

We place the platform as the core of a customer system. This allows small, tactical, even experimental apps run on a robust, stable, and connected platform. It allows fast pace for the apps, and a slower pace for the platform; it allows direct control of business apps by the business, and full control of the platform by IT management—pre-integrating the assets needed for configuration and for development done by the business units.

Artifact aspects (components, connectivity, configuration, and constraints) of an architecture are described; the architectural documentation. Our architectural descriptions use:
  Decisions—log, guidelines (maps)
  Perspectives—styles, patterns (views)
  Domains—technology, business (models)
  Ownerships—change-the-cloud (program, portfolio, product, project development), run-the cloud (portfolio, platform operations, platform resource allocation)

Enterprise customers have IT enterprise architectures, methods, and the appropriate organizations to support these. The descriptions here shall be a light approach to augment or to adapt to the leading customer's architectural artifacts. The method—essentially our architecture system—is about platform architecture of a customer system—not enterprise architecture.

We distinguish four—and only four—explicit architecture types of the platform architecture for a customer system that address the customer's business model, the customer's services, the customer's processes, and the customer's data. For example: we do not needed to consider infrastructure architecture, e.g. pod structure and pod availability in regions due the software-as-a-service platform Salesforce provides. FIG. 4A is a diagram illustrating a relationship between four architecture types related to a customer system.

Architecture type units are deliverables that are specific for the platform architecture; they define and detail the architecture types.

The architecture is for Marketing Cloud and for Sales, Service, Community, and Analytics Cloud—as well as for apps. The types and its details may need updates according to Salesforce releases. This leads to a revision of the architecture method. The architecture version for a platform product release depends on the current architecture method revision.

Tooling may support the combination of the planning (creation and assessment) process with the development (design and implementation). The tooling shall support backwards traceability.

Customer Business Model: Go-to-Market Architecture—Customer Value View

To respond to the strategic business model of the customer we define a go-to-market architecture (GTMA). The leading artifact is the customer value view.

The go-to-market architecture documents how the customer benefits from the value of the platform, co-creating value in the customer system for a given point in time.

The customer value view and the portfolio commercialization model have to consolidate and to harmonize different go-to-market strategies that may exist for the set of products on one platform.

TABLE 3

Aspects for GTMA

| Aspects | Go-to-market |
|---|---|
| Componentization | Customer value view |
|  | Portfolio commercialization model |
| Connectivity | Customer contact model |
| Configuration | Initial product backlog |
|  | Release stage model |
| Constraints | Product increment approach |

Within the "GoToMarket Architecture" the main value this type can generate is a holistic understanding (=view, starting from a kind of helicopter down to the details) of the customer values. What drives his business, what impact technology, competitors, partner network, his customers (channel, direct) and their usage of information has on the customer company's future.

Having now our platform as a target environment, the setup of this platform is based on a couple of crucial decisions at the start of the implementation (same when adding new customized "products or apps"), which, when not properly identified, cause risks either for higher, unneeded maintenance costs for the customer or even more bad, in the build back of a setup. Having thousands of users already on the platform you might assume, that the related cost tag could be critical to explain. Following our described path thru the GoToMarket Architecture Type should now guide a customer, with the help of a consultant, in a structured, defined way, to identify areas of misconceptions, missing links or "black holes" of their product portfolio on the platform.

This means, that a set of instructions in a defined order, a kind of handbook how to apply the capabilities of our platform for the given, always individual customer environment, that is a picture about the customers future using our platform this customer gives a value to it: Customer Value View. On top the disclosed methodologies make this part repeatable and by build in an application, efficient.

Customer Services Model: Platform Environment Architecture—API Model

To reflect on the new systems or planned systems and the system services model of the customer we define a platform environment architecture (PEA). The leading artifact is the API model.

The API model will enable platform connectors—for specific data or specific functionality, dedicated to either objects on the platform or functional web services for components. With these isolated connectors the integration follows the value of platform—and does not create complex system interfaces that are hard to manage.

The platform environment architecture documents how the platform interacts with the customer system.

TABLE 4

Aspects for PEA

| Aspects | Platform Environment |
| --- | --- |
| Componentization | System map |
| Connectivity | API model |
| | Backup model |
| Configuration | Deployment model |
| Constraints | Enablement map |
| | Sizing model |

Customer Process Model: Platform Component Architecture—Journey Map

To realize the customer's processes we define a platform component architecture (PCA). The leading artifact is the journey map.

The platform component architecture documents how the platform is functionally structured to execute on the defined value.

TABLE 5

Aspects for PCA

| Aspects | Platform Component |
| --- | --- |
| Componentization | App model |
| | Insight model |
| Connectivity | Journey maps |
| Configuration | Authorization model |
| | Packaging model |
| Constraints | Design guidelines (decisions) |

Customer Data Model: Platform Information Architecture—Object Model

To leverage the data of the customer we define a platform information architecture (PIA). The leading artifact is the object model.

The platform information model documents how the platform persistency is organized.

TABLE 6

Aspects for PIA

| Aspects | Platform information |
| --- | --- |
| Componentization | Object model |
| Connectivity | Migration mapping map |
| | Analytic data flow model |
| Configuration | Data catalogue (data privacy) |
| Constraints | Implementation decisions |

Architecture Analysis and Assessment—Quality Type

Quality is a prerequisite of success and has the following defined types:

Complete (CT) architectures have all necessary parts, based on product backlog (product increments, e.g. a release).

Consistent (CS) architectures are without contradictions, backward compatible: functionality, roadmap, minimal valuable product, enhancements, etc.

Correct (CR) architectures ensure scalable, secure, interoperable artifacts, checking Salesforce limits and product features, etc.

Compliant (CA) architectures are legally, regulatorily agreed, e.g. by internal or external policies and audits.

The architecture having all four qualities are considered as confirmed.

Each deliverable for the platform architecture must have all four quality types—as each componentization, connectivity, configuration, and constraint must be complete, consistent, correct, and compliant.

Architecture Conceptualization and Creation—Level of Detail

Requirements for an architecture have different levels of detail during the creation process:

Feasible (F) architectures can be done on the platform.

Preliminary (P) architectures have all the needed resources and capabilities available to execute on the platform.

Detailed (D) architectures document the allocation of the resources.

Scheduled (S) architectures are bound to releases, sprints, product increments based on an implementation approach. It has versions, discrete stages.

The architecture as the last stage of creation is realized. This is considered outside planning. Architectural chance might be scheduled for a certain sprint; after the sprint is delivered, the scheduled architectural change is considered realized. FIGS. 4B-C are diagrams illustrating a relationship between these four levels of detail.

The customer system shall perform a purpose: a certain customer need shall be realized. To plan the platform architecture of customer system the architectural deliverables (i.e. details of each architecture type unit) need a logic order of work: what do we start with? What do we need to have to proceed? When are we finished?

This order of deliverables is organized in four discrete stages. A deliverable of an architecture is created in such a way that is belongs to one and only one of the four stages; the stages depend on each other. This eliminates stateless refinement of architecture documentation that is hard to track.

Feasible—possible and practical to do easily or conveniently—means the platform architecture can support the customers' needs. With the architectural deliverables defined for that stage the customer owning the customer system can be assured that the system is appropriate for the needs presented.

Preliminary—preceding or done in preparation for something fuller or more important—means the platform architecture is understood well enough to start planning the realization of the customer needs on the platform. With the architectural deliverables at that stage the customer can allocate resources to create the plan, or approach, or frame of reference for realization and additional effort to finalize the creation of the architecture.

Detailed—having many details or facts; showing attention to detail—means the platform architecture has the facts to realize the customer needs. With the architectural deliverables at that stage the platform architecture is documented for realization planning and for finalizing the architecture (documentation).

Scheduled—included in or planned according to a schedule—means the platform architecture will support the customer needs for a defined point in time, a release. With the architectural deliverables at that stage the platform architecture is documented for realization planning and for finalizing the architecture (documentation), might be during the development.

Platform Architecture Creation and Platform Assessment Process

Platform Pulse for System Maturity as Progress Visibility and Platform Quality

The architecture method enables the documentation of a Salesforce instance (org) on the org itself. Continuous delivery on the platform demands a combination of creating and assessing the platform architecture at the same time. To make this trackable architecture creation and assessment, the planning, has to leave an implicitly imposed waterfall type of approach. Decisions on architecture ought to happen at the right point in time.

Documentation is often in different conditions; in an agile development environment architecture might be an afterthought or out of sync—or is addressed when things already went "wrong". Oversight to plan—or even to motivate—next architecture actions for progress and for quality is needed. Potentially, this will reduce documentation effort and the rework effort, especially if tooling support the linkage to the relevant software artifacts (like visual flows, and object schemas) with the metadata capabilities of the platform.

The combination of platform quality types and levels of detail, the progress, defines the Salesforce platform maturity or health of a particular customer system based on the artifacts of each architecture type. The method calculates a numerical value called pulse for each architecture type and for all four architecture types combined—as a metric for the overall platform maturity of the customer system (the platform is always connected to external applications, devices, etc.).

The architecture marker (AM) is the input matrix of the quality types and levels of detail. It has 0 or 1 ("tick the box"); 1 is used when the architecture type is considered done for the combination, a juxtaposition of quality type and level of detail, e.g. the go-to-market architecture has feasible completion, 0 means it is not ready. This is the only needed input (four times for the four architecture types: GTMA, PEA, PCA, and PIA) to present maturity as one numerical output value—the architecture pulse for the given architecture pulse—to the system owner.

FIG. 20 shows a non-optimal architecture marker for the GTMA; the upper box is input due to the status, condition, or stage of the architecture type, and the calculated pulse output is shown in the lower box.

The marker is following an earned-value thinking of project management. The matrix can be filled manually by the system owner responsible for the documentation or by the system (org) itself when the architecture type units are bound by metadata of the org as tolling may provide traceability of the architecture type unit to the affected software artifacts on the platform. Plausibility—for quality and for progress—is checked immediately by the existence of the appropriate architecture type unit details.

The architecture marker matrix is weighed by a quality level weight matrix (QLW), an example of which is shown in FIG. 21; this atomic weight matrix is not visible to the system owners. It recognizes the sheer existence stage of the architecture type unit details.

The level of detail has progressive weights (PLW) for stage changes from feasible to preliminary, from preliminary to detailed, from detailed to scheduled—and from feasible to detailed, feasible to scheduled, and preliminary to scheduled. This weight is not visible to the system owners. It allows rewarding or penalizing the right order of creating the deliverables (the architecture type unit details), hence, the dependency of moving from the right level of detail to the next. During assessment it may show gaps that need action and may result in rework of already created architecture deliverables.

With the atomic weight individual pulses for the eight atomic statuses can be calculated: for feasible, preliminary, detailed, and scheduled—and for complete, consistent, correct, and compliant. The atomic pulses is a matrix product with the direct marker. The six progressive weights showing the possible level of detail transitions are a matrix product with the inverse maker to take non-existence into account for the pulse. These individual pulses isolate the stages and take their dependencies into account for one numerical value. For the given example the individual pulses are:

TABLE 9

Individual pulses for the eight atomic statuses and the six progressive weights

| INDIVIDUAL | PULSE | WEIGHT | |
|---|---|---|---|
| Feasible | 3 | 4 | A x |
| Preliminary | 3 | 4 | |
| Detailed | 2 | 4 | |
| Scheduled | 2 | 4 | |
| Complete | 2 | 0 | |
| Consistent | 4 | 0 | |
| Correct | 4 | 0 | |
| Compliant | 0 | 0 | |
| Feasible-Preliminary | 0 | 1 | P (1 − x) |
| Preliminary-Detailed | 1 | 1 | |
| Detailed-Scheduled | 0 | 1 | |
| Feasible-Detailed | 1 | 1 | |
| Feasible-Scheduled | 1 | 1 | |
| Preliminary-Scheduled | 1 | 1 | |

The architecture pulse (AP) for each architecture type is the sum product of the individual pulse vector and the pulse weight vector (PW) and normalized to 1.0 (divided by 64 based on the given pulse weights). The pulse weight is not visible to the system owner of the org. This results in one numerical value representing the condition (health, maturity) of that particular architecture type; the example gives 0.69 for GTMA.

The weights have to be calibrated the same way if multiple orgs shall be comparable. The calibration is done by the method owners and part of the internal method structure. The system owner is—with the help of additional information in the org—ticking the box of the architecture marker (AM) matrix; and nothing else is needed to derive a pulse.

The current situation of an architecture type can be visualized as an eyeball in between the ideal stage progression of architecture type unit details and the worse stage progression. Calibration may move the ideal trajectory and the worse trajectory if needed. The calibration will normalize to 1.0 to keep number relatively comparable.

Figure 5:
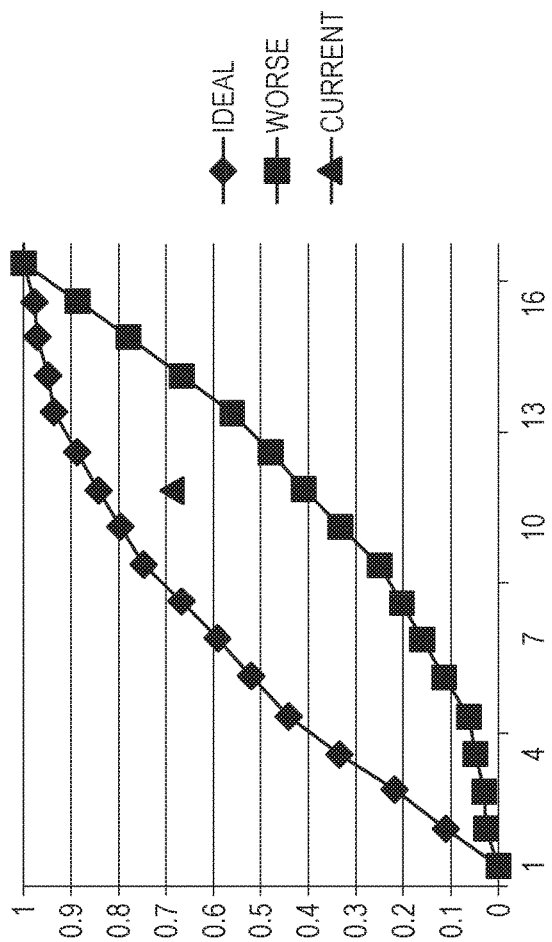
FIG. 5 is a graph illustrating the success platform pulse.

Success platform pulse (SPP) of a customer system is a numerical value as the one architectural measure of the platform. It is the weighed product normalized to 1.0 of the for architecture pulses for each architecture type. This allows tracking the technical condition of the org with one numerical value. FIG. 5 is a graph illustrating the success platform pulse.

With the platform pulse architecture becomes trackable and actionable; the tolling support makes it traceable. The pulse will motivate action and can locate, focus the action based on the architecture type unit details associated; architecture is used to plan, to structure, and to steer functional development.

Success Gates as a Lightweight and Adoptable Governance Mechanism

The quality types and levels of detail describe overall customer system architecture stage or condition based on all four architecture types separately with a certain risk. Quality exist for each level of detail, e.g. for complete feasibility the architecture artifacts exit. The confirmation or governance of the architecture assessment and conceptualization are combined in success gates—leveraging the progress based on the predefined level of detail structure.

This creates visibility into the creation and assessment process to empower agile project management. Success gates for Salesforce are lightweight checks that can be incorporated into existing governance and management frameworks. They are checking the Salesforce relevant customer system architecture. Success gates confirm proper actions have been taken to make needed decisions.

Success gates shall use the architecture pulses to determine eligibility to enter the success gate from an architectural maturity point of view. They provide the entry criteria of the success gates.

Figure 6:
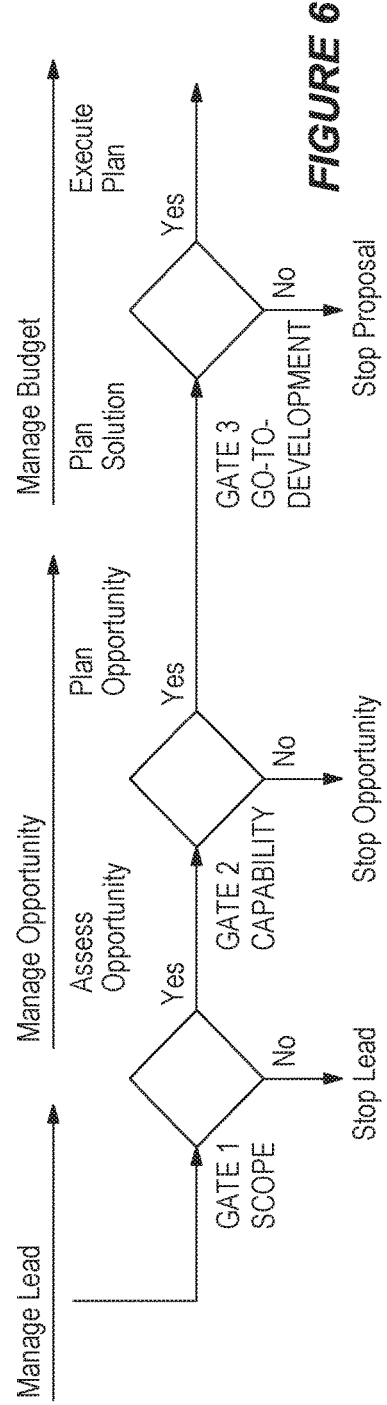
FIG. 6 is a diagram illustrating three success gates

FIG. 6 is a diagram illustrating three success gates. Each gate evaluates product requirements, estimation, and risk assessment for the particular deliverables with a go-no-go decision and the appropriate resource allocation; hold and reschedule are possible aligned with the sales cycle or development cycle. Commercial (development costs and commercial costs vs. ACV and TCV) and technical criteria (complexity and skills) are combined.

Accelerators—as part of product projects, programs—are then delivered in such a way that they contribute to the customer system planned with the platform architecture to show its success and value. An accelerator—costing a defined number of points—will then contribute to increase the platform pulse to a certain number—for a specific architecture type unit, e.g. a feasible completeness is moved to scheduled consistency and compliance.

Scope Screen—Based on Objectives or Customer Requirements

Success Gate 1 (S1) determines the value proposition and initial Salesforce positioning (separating declarative, programmatic, and integrated scope), initial sizing (users, transactions)—to enable feasibility, demo readiness, and strategic fit. It answers (1) market and customer attractiveness and (2) product advantage: Do I want to answer? Do I proceed with Salesforce?

The customer value and vision with the go-to-market architecture is addressed: success metrics and commercial benefits are created. The platform environmental architecture is created. It focuses on the transformation.

The exit criteria are: ballpark estimate, the project leadership assignment (lead business analyst, lead architect—responsible for the bid and project). A trail and prototype environment exits. The scope screen shall incorporate the proof-of-concept and the proof-of-market (P1, P2)—components and connectors.

Capability Screen—with Confirmed Initial Product Backlog

Success Gate 2 (S2) describes the Salesforce solution architecture and sourcing (licenses, skills, activities) to determine "doability" and user benefit justification. It answers (3) leverage competencies and (4) technical realization: Can I do it? Can I deliver the initial product backlog?

The platform architectural readiness is addressed by a platform information architecture. It allows determining the licenses. It focuses on governance and allows budget planning and resource allocation.

The exit criteria are: T-shirt size estimates with a consolidated formal sheet and work-breakdown structure for customer journey, the core team allocation, partner ratio, and internal expert's identification. A pilot environment, system context, and third party Salesforce managed packages exit. The capability screen shall incorporate the proof-of-product and the proof-of-scale (P3, P4)—configuration and constraints.

Go-to-Development—Contract Ready for External and Internal Budget

Success Gate 3 (S3) checks the phased release plan and implementation confirmation (consultants, developers, architects) and major business and technology decisions for commitment and appraisal. It answers (5) risk vs. reward: Can I commit to deliver the estimated effort?

Platform design readiness is achieved with a component architecture and environment architecture. It establishes management and engineering.

Exit criteria are: contingency biased day estimates, margin, rate card standard and adjustments (fixed price or T&M) and the team staffing (resource model, RACI if needed). Environment interfaces, org and sandbox plan exit.

Agile Platform Development Process Outline

For the planning purpose of architecture regarding the Mach approach (strategic customer system alignment) we consider the following two gates out of scope.

Hence, we want to mention these to establish a continuous level of visibility: a Success Gate 4: Ready-for-adoption (essentially, allowing end-user testing, training, deployment, etc.) and a Success Gate 5: Ready-for-success (release documentation, launch preparations, support processes, etc.) have to be taken into account. These two gates might be embedded into the agile development and mainly focus on the management and engineering of customer systems.

During operations (run-the-cloud) there are additional success gates, scheduled or ad-hoc based on success plans or defined demand. We define Request-for-feedback success gates. Organizations add this Success Gate 6 during operations (run-the-cloud) for review, improvement, optimizations, adoption, lessons-learnt; it can be scheduled on a regular basis, e.g. in preparation for a Salesforce release or just according to troubleshooting needs.

The implementation is an architecture-driven, agile product development and commercialization lifecycle. Projects are treated as products. The architecture method is independent from the type of agile development used, e.g. Scrum or Kanban. If the development is based on sprints or product increments, the following artifacts will be guided by architecture: the initial product backlog, sprint planning, sprint backlog, product increment, sprint review, and product increment retrospective.

Design is part of the development process. Sourcing (based on team members or accelerators used) is managed during the development process for each sprint or product increment. Sourcing includes the combination of Force.com or other apps, Sales or Service Cloud, Analytics Cloud, or Marketing Cloud with the appropriate communities. Sourcing aspects normally have an overall budget planning outside of projects. All the resource allocation needed broken down from the strategic program to the portfolio and the products relevant for the platform are part of the sourcing. Architecture structures such resource allocation.

A product increment may be a release. Architecture might be impacted during development and has to be addressed in product increment retrospectives. We define architecture for a system that is evaluated, assessed for a release. A release (and consequently each sprint or iteration) contains:

New Salesforce releases features (if applicable, pilots)
New features based on projects (e.g. fixed price)
New features based on change requests (additional costs)
Rework (refactoring—no bugs, no functional requirements)
Defects (bugs)
The architecture adjustment that goes with it (if needed)

The product backlog for a release must define the scope. A product increment of a prioritized product backlog may have architectural impact. Rework might be triggered due to design (code) needs or architecture (system, platform) needs. The architecture adjustment is might be needed for certain design considerations.

The Platform Planning Process and Deliverable Structure

Architecture type unit details are deliverables that have a certain level of detail to create or assess an architecture type unit for each architecture type. The customer system framework and the platform architecture define types, units, and its details. Each level may have architectural decisions. Tooling may support the direct link to software artifacts on the platform using the metadata description of these artifacts. FIG. 7A is a tree diagram illustrating a relationship between architecture type, architecture type units (ATUs), and ATU details. Using this taxonomy we define explicitly for the four architecture types (GTMA, PEA, PCA, PIA) and their units the architecture type unit details.

FIG. 7A also illustrates a mapping and/or linking of metadata, e.g. platform metadata artifacts (such as known platform metadata artifacts), to the ATUs. The mapping and/or linking of platform metadata artifacts to the ATUs may be structured data stored in a structured database. This mapping and/or linking may be used during platform architecture creation and/or assessment. In some implementations, tooling may be provided to utilize this mapping and/or linking to automate or semi-automate a portion of a platform architecture creation and/or assessment.

In an example, the platform information architecture type may include an object model ATU. The preexisting cloud platform may include object metadata. The object metadata of the preexisting cloud platform may be mapped and/or linked to the object model ATU of the platform information architecture.

Figure 7B:
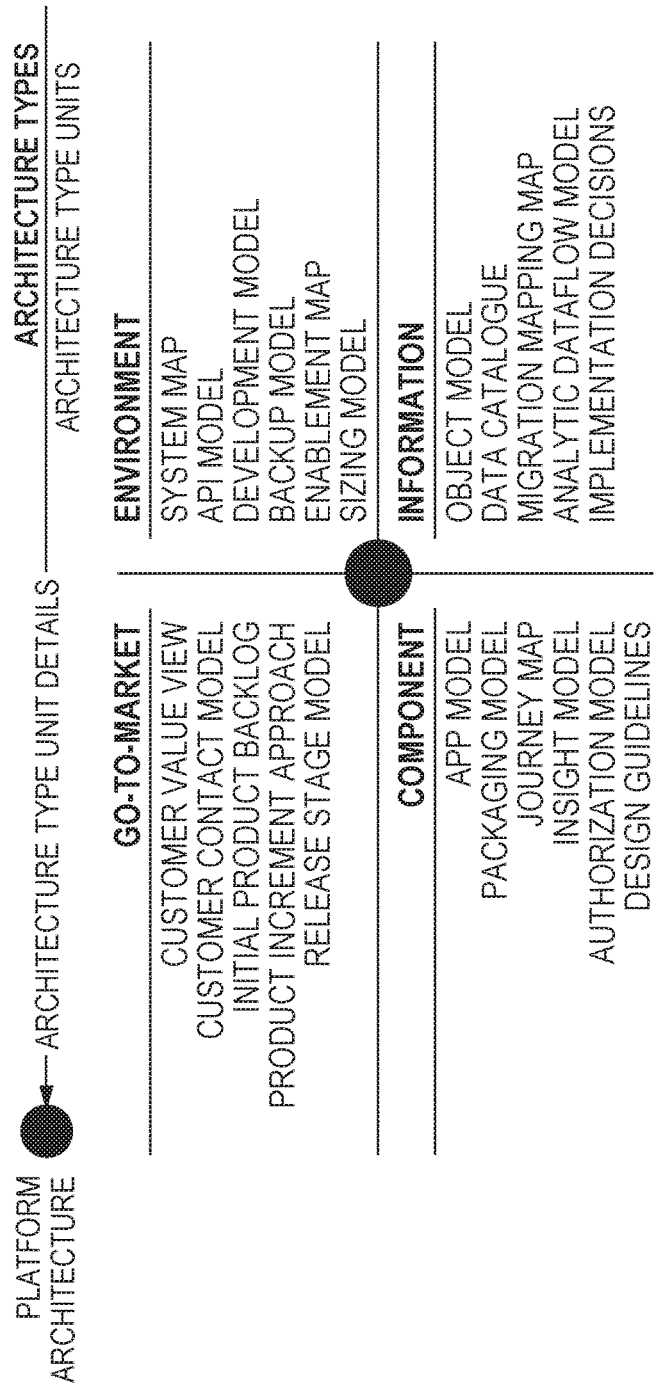
FIG. 7B is a diagram illustrating an example of ATUs for the architecture types.

FIG. 7B is a diagram illustrating an example of ATUs for the architecture types.

Risks are managed on each deliverable driven by the four architecture types of the platform as a factor quality during the platform architecture creation and assessment process. The risk impact due to the platform architecture is prestructured. The probability is a judgment call.

The impact depends on scale, e.g. the number of objects and its records will define information architecture risk, especially for compliance. It may have additional performance or scalability, robustness risks—as it would have for the component architecture with the number journeys or the number of application (API model).

TABLE 10

Risk impact assessment

| Risk Impact Assessment | Go-to-market architecture | Platform environment architecture | Platform component architecture | Platform information architecture |
|---|---|---|---|---|
| Goal | Understand business model and business case | Orchestrate external and internal services | Understand process model | Get insights into data persistency, repositories, and dependencies |
| Change & run focus | Financial, value | Organizational, applications | Functional, journeys | Technical, objects |
| Quality focus | Correctness: Customer relevance | Consistency: Resource allocation | Completeness: Acceptance coverage | Compliance: Regulatory protection |

The planning process combines the creation and assessment process for the platform using the platform pulse as a measure of maturity. Continuous delivery demands making these dependencies between change-the-cloud (creation) and run-the-cloud (assessment) activities explicit. The Salesforce platform releases, general common, but customer specific components of platform (e.g. standard connectors to legacy), and individual custom components in apps (e.g. of different business units) have to be taken into account.

The success gates give discrete visibility into that process. The success gates are light touch points of this architecture method for existing budget planning or resource allocation processes within an enterprise. We want to foster easy adoption of the method having defined dependency and focusing on the platform.

The deliverable (the architecture type unit detail) defines the capability, the skills needed to execute the process action. The described deliverable structure of the architecture is like a grid on the Salesforce platform to localize where activities have to happen.

An initial default governance setup focusing on planning to define the success gates based on the architecture pulse may look like this, e.g. for the first success gates all activities to get a detailed go-to-market architecture, feasible environment and component architecture, and a preliminary information architecture have to be planned and delivered. The association can be done on the architecture type unit if needed.

TABLE 11

Architecture type for success gates

| Architecture type for success gates | Scope Screen (S1) | Capability Screen (S2) | Go-to-development (S3) |
|---|---|---|---|
| Go-to-market (GTMA) | Detailed | Scheduled | |
| Platform Environment (PEA) | Feasible | Preliminary | Scheduled |
| Platform Component (PCA) | Feasible | Preliminary | Scheduled |
| Platform Information (PIA) | Preliminary | Scheduled | |

A scheduled architecture (type) means that all its scheduled architecture type units are: complete, consistent, correct, and compliant. This holds true for all level of details. Based on the method setup the actual architecture pulse threshold can be determined to be eligible for a particular success gate.

The flow for the architecture process has the following architecture actions. The assessment actions may lead to creation actions, if updates are not good enough. The six actions are done for each success gate creating a spiral flow for a defined maturity (level of detail, quality).

Figure 8A:
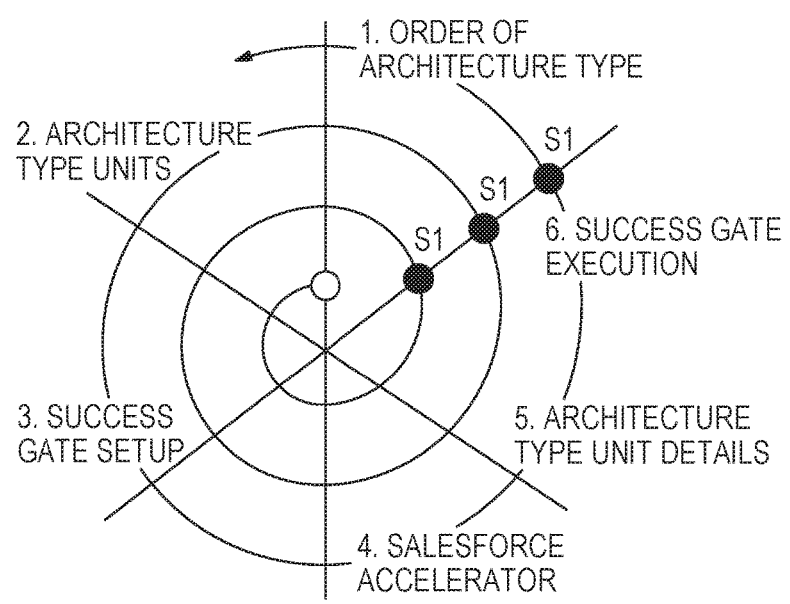
FIG. 8A is a diagram illustrating a spiral flow process for a defined maturity (level of detail, quality) for four example architecture types.
Figure 8B:
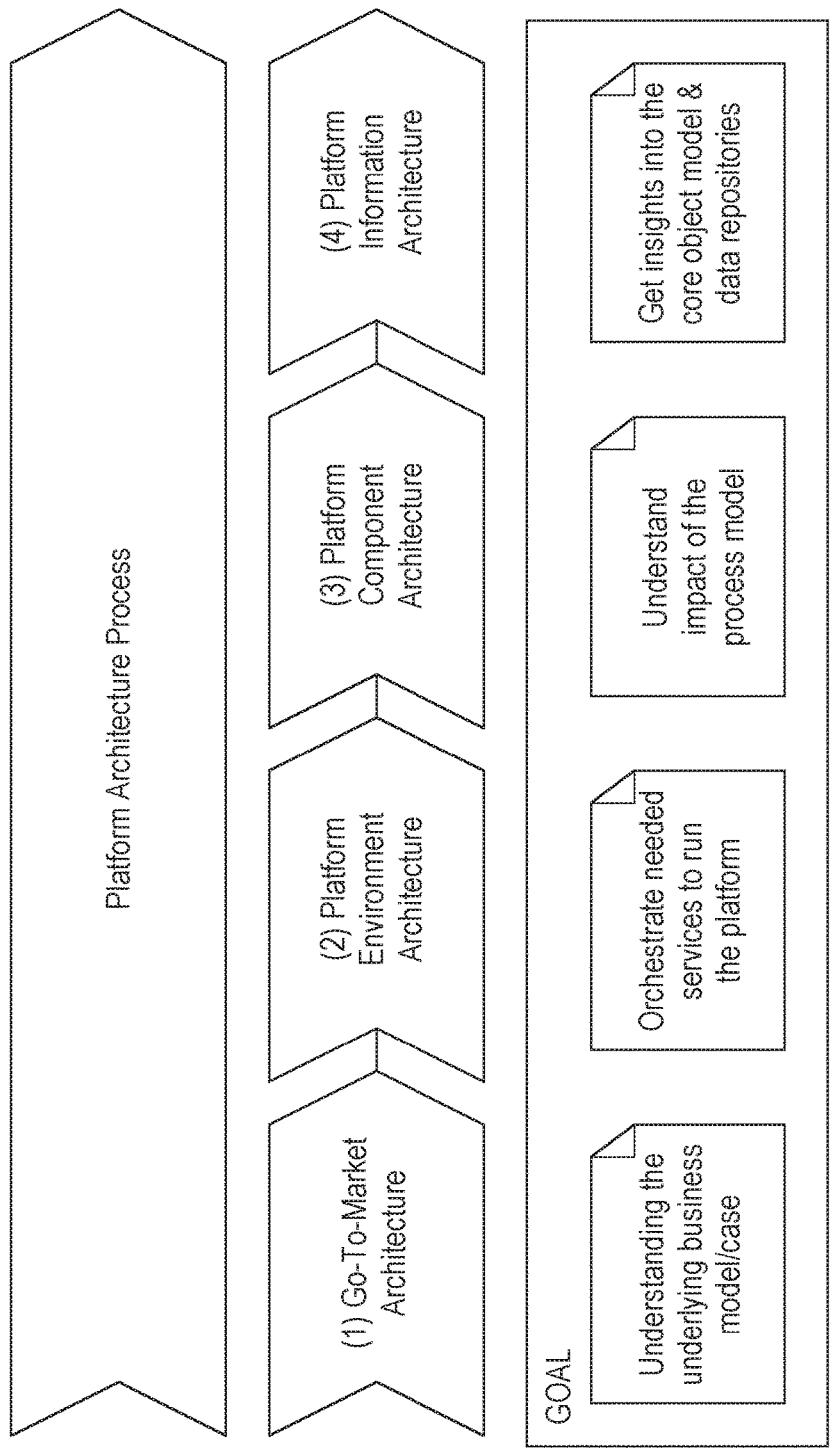
FIG. 8B is a diagram illustrating goals associated with each of four example architecture types.

The deliverables (ATUD) are defined for each architecture type unit (ATU) as part of the architecture method to ease planning. FIG. 8A is a diagram illustrating a spiral flow process for a defined maturity (level of detail, quality) for four example architecture types. FIG. 8B is a diagram illustrating goals associated with each of the four example architecture types.

Referring again to FIG. 8A, the following lines are illustrated—line 1 (order of architecture type), line 2 (architecture type units), line 3 (success gate setup), line 4 (salesforce accelerator), line 5 architecture type unit details) and line 6 (success gate execution). These lines correspond to the rows of Table 12. Also, the spiraled line includes an arrow indicating a path of progression from a starting point. The success gates S1, S2, and S3 and positioned on the spiraled line.

Go-To-Market Architecture (GTMA)

The UX realization is determined by the channel—it can be Visualforce, Lightning Experience, native apps, or Marketing Cloud messages, (e.g. email, SMS), CloudPages, Fuel UX, etc.

TABLE 12

Platform architecture creation and platform architecture assessment

| Process Action Guidance | Platform Architecture Creation | Platform Architecture Assessment |
|---|---|---|
| 1. Define the order of architecture types (AT) | Create action plan<br>Note: For a new portfolio, product, or feature, the order is (to reduce dependencies issues):<br>1. GTMA<br>2. PEA<br>3. PCA<br>4. PIA | Plan architecture impact<br>Note: For existing platforms, it may depend on the issue demanding the analysis.<br>Selecting the needed types (GTMA, PEA, PCA, or PIA) may reduce and focus the analysis. |
| 2. Identify architecture type units (ATU-AT) | Check the status of existing deliverables (prep work) Allocate resources accordingly<br>Check Salesforce architecture knowledg base<br>Establish risk mitigation<br>Check the Salesforce release changes (new platform functionality for future products) | Access the Salesforce platform and document software artifacts (using Salesforce metadata)<br>Determine the deliverable status (quality, level of detail)<br>Calculate architecture pulse |
| 3. Confirm success gates setup (S1, S2, S3, S4, S5, S6) | Agree level of detail association to go-no-go decision (scope, capability, go-to-development)<br>Define timeline | Agree on the right gates based on the architecture marker<br>Check relevant gate readiness (adoption, success)<br>Note: For a particular issues some gates may already passed |
| 4. Identify Salesforce Accelerator | List needed accelerators<br>Note: this depends on the Salesforce Support success plan in place | Check accelerators solving the particular issue |
| 5. Create architecture type unit details (ATU-ATUD deliverables) | Define delivery accountability<br>Produce the defined deliverables<br>Check quality and risk<br>Calculate architecture pulse and platform pulse | Determine the remaining details<br>Update deliverables<br>Map the software artifacts affected |
| 6. Execute the relevant success gates | Check relevant level of detail and quality of the deliverables (pulse)<br>Make go-no-go decision<br>Note: For planning S1, S2, S3 | Confirm change<br>Update knowledge base |

TABLE 13

GTMA ATUs and ATU details

| Deliverable | Feasible | Preliminary | Detailed | Scheduled |
|---|---|---|---|---|
| Customer value view | Value proposition, personas (customer types, role types) | Value impact driver Business outcomes | Success goals | Success metrics |
| Portfolio commercialization model | Cost-benefit Business case, product list (dependencies, priorities) | Adoption concept (incl. EWS, training) Consumption model (channels) | License model (functional licenses, editions) Support model (key user) | Price model Training (enablement) Development cost model (ballpark estimate) |
| Customer contact model | Customer channels (apps, mobile, wearables, AppExchange, RFID, product sensors, Social) | Customer interaction model (touch points, feedback, channels, e.g. SMS, push) | Customer communication model, user experience (UX, UI, branding) Style guide | Customer messaging, translation, geo-specifics Input help concept ("no barriers") |
| Initial product backlog | Customer scenarios | Customer epics (outlines) | Functional user story list (titles) Non-functional user stories | Major acceptance criteria (success) |
| Product increment approach | Stakeholder visibility | Increment approach (sprints, iterations) | Documentation framework | Role mandates |
| Release stage model | Charter (Timeline) External release frequency (e.g. three versions a year) | Major Release Milestones (Product, Salesforce Roadmap) | Internal increment frequency (e.g. weekly sprints) Release notes | Product communication plan |

Platform Environment Architecture (PEA)

TABLE 14

PEA ATUs and ATU details

| Deliverable | Feasible | Preliminary | Detailed | Scheduled |
|---|---|---|---|---|
| System map (production) | Salesforce platform (Sales, Service, Marketing, Community, Analytics) | Single-org, multi-org | Salesforce apps (functional modules) | Identity provider User management (SSO) |
| API model | External systems or clouds (protocols, adapter types, message bus) | Endpoints, interface specifications (hierarchies, dependencies) | Owner, system contracts, connector definitions, SDK usage, SLA | Instances, component dependencies, connectivity |
| Deployment model (development test) | Org instances (technical licenses) Version control systems Requirements tracking | Obstrusification (mask data) Development systems Test systems, sandboxes | Deployment automation Test automation (UI, etc.) Sprint review documentation | Org instance rollout Test plan tracking Tooling |
| Archive model | Disaster recovery model (backup) Regulatory documentation model (archive) | Data structure Event structure Location (cloud, on-premise) | Automation (ETL) Logging (runtime) | Run model (backup, archive) Certifications, audits |
| Enablement map | System management Device management AppExchange | Application management (Airwatch) | Log server, audit trail, archiving Incident management systems | Availability Event logging (internal, external) |
| Sizing model | User sizing | Transactional sizing | Data sizing (OLTP, analytics) | Event sizing |

Platform Component Architecture (PCA)

Authorization: Roles and rights have dependencies with the information architecture due to data access of the object model. The role hierarchy types may include enterprise auditor roles to check compliant setups, e.g. data privacy regulations.

Generally, a lookup object is relation is safer with a trigger than a master-detail relationship due to the visibility impact of inheritance of the master object.

Security includes roles, authorization (user profiles), role hierarchy types (in feasibility), user profile types, with permission sets and groups. Security has legal and regulatory constraints for the architecture.

Journeys may be realized by marketing cloud journeys, processes (process builder), visual flows, headless flows, or coding in different software objects or software components. It may include validation and workflow triggers.

TABLE 15

PCA ATUs and ATU details

| Deliverable | Feasible | Preliminary | Detailed | Scheduled |
|---|---|---|---|---|
| App model | Product owners Mobile, desktop, device apps | App prioritization approach Value-add platform services (common) | User story structure Product portfolio | App product mapping Initial product backlog |
| Packaging model | Cloud domains, Partner apps | AppExchange packages (to integrate) | Story boards, dependencies Run book (standard operating procedures) | Managed package |
| Journey map | Functional domains, business outcomes | Customer events Journey sequences (start, end) | Journeys (marketing, sales, service) Events (delivery, engagement) | Customer story journey mapping, activities, interactions |
| Insight model | Content usage Analytics usage Knowledge representations | Document types Insight types (reports, dashboards) | File locations File systems BI systems | Versioning Access |
| Authorization model | Organizational model (partner, channel) | Role hierarchy types, user profile types (public groups) Territory management Permission set types, record types | Object visibility and relations Permission sets, user profiles Single-sign-on (SSO) | Record ownership model Dependencies, domains, |
| Design guidelines (considerations) | Tactical, enterprise, multinational usage model (user scale) | Trade-off analysis (build, buy) Standard functionality | Customization areas Trigger structure (Apex for lookups) | Estimation model (run, change) |

Platform Information Architecture (PIA)

TABLE 16

PIA ATUs and ATU details

| Deliverable | Feasible | Preliminary | Detailed | Scheduled |
|---|---|---|---|---|
| Object model | Business entities, associations | Data dependencies (environment) | ERD with fields (grouping) Record types | Test data Production data sources |
| Data catalogue (data privacy) | Regulations | Owners | Fields Functional impact | Keys |
| Migration mapping map | Source systems, data domains | Cross reference list Cleaning goals | Data formats, field mappings Tools | Milestones for loads |
| Analytic data flow model | Report, dashboard definition | Fact table, dashboard areas | Import scripts definition, export endpoints | Org deployment |
| Implementation decisions | External and internal data Offline data | System components Data master (source, sync) | Pick lists, related lists, . . . Mobile usage, offline access | Object and field dependencies |

Object Model—Illustrative Example

The object model ensures that all needed data can be represented on the platform—in the needed formats.

TABLE 17

Object model

| Object model | Feasible | Preliminary | Detailed | Scheduled |
|---|---|---|---|---|
| Architecture type unit details | Business entities, associations | Data dependencies (environment) | ERD with fields (grouping) Record types | Test data Production data sources |
| Complete | → input data and derived data specified? | → analytical data represented? → data accessible inside or outside enterprise? | → business relevant fields used where? → consolidation of data for record types identified? | → exceptions data sets representations planned? → development data sets consolidated? → migration sources clarified? |
| Correct | → naming convention addressed? | → entities, separated? → relationships defined (1:1, 1:N, N:M)? → transactional data identified? | → volume (data sizing) estimated? → data ownership agreed? → field length confirmed? | → test case data accepted? → export mechanisms identified? |
| Consistent | → internal data known? | → external data identified? → ID mapping specified? | → logical field mapping done? | → test data coverage confirmed? |
| Compliant | → areas like PII protection known? | → entities and type of protection defined? | → applicable limits anticipated? → data catalog with protection classes agreed? | → test data usable, obfuscated when needed? → data sources accessible? |

The following metadata can be derived from the platform for the object model (Salesforce1 tooling):
Force.com objects
Analytics datasets Customer Architecture Description and Outcome Example artifacts considered tooling may include Architecture Type Template, Architecture Type Unit Template, Architecture Type Unit Detail Template, Success Architecture Decision Template, Customer Success Journey Description Template, Platform Connector Description Template, and Architecture Accelerator Description Template.

Architecture Type Template

The platform architecture consists of four distinct architecture types. A customer system may add additional architecture types.

TABLE 18

Architecture Type Template
Architecture Type Template

| | |
|---|---|
| Name | The name of the architecture type, e.g. a domain |
| Definition | Description |
| Type units | The list of units the architecture type has |
| General decisions | The list of success architectural decisions |
| Success Platform Pulse | A number calculated based on the type units' marker or a general judgment of them maturity and health |

TABLE 18-continued

Architecture Type Template
Architecture Type Template

| | |
|---|---|
| Architecture risks | Define a list of risks (probability, impact, mitigation) |
| Risk factors | To calculate the architecture pulse risk factors for completeness, consistency, correctness, and compliance as a weight of importance is assumed |
| Organization ID list | The orgs (Salesforce instances) involved, multi-org environments may define one master org for the architecture documentation |
| Change the cloud | Owner accountable for the product, project |
| Run the cloud | Owner accountable for the operations |

Architecture Type Unit Template

Each architecture type has architecture units defining the overall architecture type. The architecture type unit is the architectural deliverable.

TABLE 19

ATU Template
Architecture Type Unit Template

| | |
|---|---|
| Name | The name of the architecture type unit |
| Definition | Description |
| Type units details | The list of units details the architecture type unit has |
| General decisions | The list of success architectural decisions |
| Success Platform Pulse | A number calculated based on the type units' marker or a general judgment of them maturity and health |

TABLE 19-continued

ATU Template
Architecture Type Unit Template

| | |
|---|---|
| Architecture risks | Define a list of risks (probability, impact, mitigation), can be based on the risk assessment of the architectural decisions or the architectural deliverables |
| Risk factors | To calculate the architecture pulse risk factors for completeness, consistency, correctness, and compliance as a weight of importance is assumed |
| Owner | The person accountable |

Architecture Type Unit Detail Template

Each architecture type has architecture unit defining the overall architecture type. The architecture type unit detail is the architectural deliverable.

Type unit details associate to the actual existing Salesforce platform artifacts.

TABLE 20

ATU Detail Template
Architecture Type Unit Detail Template

| | |
|---|---|
| Name | The name of the architecture type unit |
| Definition | Description |
| Level of detail | Feasible, . . . |
| General decisions | The list of success architectural decisions |
| Dependencies | List of type units this type unit details relies on Note: this allows backward traceability |
| Platform artifacts | List existing artifacts in the customer system (Salesforce tooling API) |
| Author, Creator | The person responsible |

The type unit details or if needed the type units can be mapped (leveraging the tooling API) to the existing or expected platform artifacts, like workflows, visual flows, data flows, objects, etc.

Success Architecture Decision Template

Decisions are made for go-to-market, environment, information, and components.

Security decisions are made for each of the architecture types.

A success architectural decision can be for the customer architecture or the platform architecture, using a known success architecture decision template, such as the following:

TABLE 21

Success Architecture Decision Template
SAD-000x Success Architectural Decision

| | |
|---|---|
| Business Drivers & Technology Drivers | Why do we need an AD for this? May include motivation, success criteria, or metrics, identify platform domains<br>Include technical roadmap impact<br>Include business needs, goals, and objectives |
| Decision taken | Description of the architectural aspects, realization decisions, and implementation impact, may include different architectural perspectives from mobile, SOA, master data management, integration, business functionality<br>Note required standards and controls |
| Alternatives investigated | 1. May include pros and cons for the given context<br>2. May include options not looked at for a given reason<br>3. . . . |

TABLE 21-continued

Success Architecture Decision Template
SAD-000x Success Architectural Decision

| | |
|---|---|
| Rationale | 1. Reasons to choose . . . functional customer journey needs<br>2. Proof-of-concept showed success . . . technical consolidation<br>3. . . . |
| Tradeoffs | The AD may have constraints in general or if requirements may change, e.g. scalability or maintainability. May include the list of alternative patterns or approaches<br>May include system boundaries, validity for certain applications<br>A. Point-to-point |
| Stakeholders | Business and IT (development and operations)<br>May have a RACI, include run-the-cloud and change-the-cloud, include BA and TA, program architects, process owners, data ownership (golden source)<br>May note the stakeholder's specific concerns |
| System Components & Dependencies | The type of cloud involved, e.g. Sales Cloud or Marketing Cloud, the components, e.g. Social Hub - and the on-premise applications, e.g. backend ERP<br>May include system dependencies like ESB or ETL; may change due to architecture<br>May link other architectural decisions, link to system context |
| Implementation hints & Risk Mitigation | Planned changes in the system architecture, other release or program requirements, common services usage, reporting<br>Understanding of system change introduced, architectural decision log consistency and completeness<br>Include audit and regulatory controls and policies (if needed), |
| Assumptions & Roadmap Impact | Any assumptions, or open issues for the customer journey, may result from a customer journey walk-thru or initial business validation, may document design constraints, or remove realization ambiguity<br>Define lifecycle impact for operations<br>Include customer journey dependencies, links to documentation<br>List the architecture types affected |

Customer Success Journey Description Template

A success journey describes requirements of the platform. An example of a known success journey description template, which is also referred to herein as a "journey", is shown below:

TABLE 22

Customer Success Journey Description Template
CSJ-000x Verb-Object Success Journey

| | |
|---|---|
| Business Outcome & Customer Epics | A description, summary of the customer journey, e.g. "Create Lead" and its benefits, ought to be out of the customer perspective with the result defined<br>Can have the high-level format of a customer epic: As a major actor I must, should, will be able to, provide, a business entity so that I benefit from that system objective.<br>May include metrics and reporting hints for the business outcome |
| Functional Domains & Supporting Users | The functional domains the customer journey is associated with; there can be multiple if the journey is touching multiple components of different domains.<br>The human users, roles, user groups, or profiles involved; for additional interactions besides the major actor |

TABLE 22-continued

Customer Success Journey Description Template
CSJ-000x Verb-Object Success Journey

| | |
|---|---|
| Step Sequence | The actions of a successful flow; may include process map (BPMN) link; the number of the sequence action is mandatory.<br>Sequence (one or two levels, depending on complexity):<br>    Create User<br>        Create profile (subsequence if needed)<br>        Ensure licenses<br>    Login User<br>. . . |
| Variations | These are the steps of the alternate flow, exceptions, or compensation actions; other deviations or process dependencies<br>    Password denied<br>        Send email - to reset password<br>. . . |
| Start-end Definition & Conditions | Journey start: event to trigger the journey<br>Journey end: results and termination of the journey contributing to the business outcome<br>Variations, may include operational impact<br>Include start and end condition for success and for failure |
| Stakeholders | Business and IT<br>May have a RACI, include run-the-cloud and change-the-cloud, include BA and TA<br>May note the stakeholders interests |
| System Component Candidates | The type of cloud involved, e.g. Sales Cloud or Marketing Cloud, the components, e.g. Social Hub - and the on-premise applications, e.g. backend ERP<br>May include system dependencies; may change due to architecture |
| Design Considerations | May include implementation hints (declarative configuration of workflow or rules Apex programming Visualforce), integration trade-offs (interface standards), non-functional requirements, constraints, page layout types, relevant regulation, or internal policies |
| Assumptions & Dependencies | Any assumptions, or open issues for the customer journey<br>Include customer journey dependencies |
| Diagram Link | The link to the graphical representation is the chosen tool.<br>Can be the link in Salesforce, e.g. Marketing Cloud Journey Builder, Visual Flow, etc.<br>Normally on the user acceptance test (non-productive) sandbox |

Platform Connector Description Template

Each external interaction of platform, not only each physical endpoint, needs a description.

We define a platform connector as an API and functionality to communicate with an external endpoint for a particular purpose. A known system interface description, e.g. a Platform Connector Description Template, is shown below:

TABLE 23

Platform Connector Description Template
PC-000x (Verb-Object) Platform Connector

| | |
|---|---|
| Business Drivers & Service Contract | A description, summary of the customer journey, e.g. "Create Lead" and its benefits, ought to be out of the customer perspective<br>Can have the high-level format of a user story (customer story): As a major actor I must, should, will be able to, provide, a business entity so that I benefit from that system objective.<br>May include metrics and reporting hints |

TABLE 23-continued

Platform Connector Description Template
PC-000x (Verb-Object) Platform Connector

| | |
|---|---|
| Supporting Users | The human users, roles, user groups, or profiles involved; for additional interactions besides the major actor<br>External system owners |
| Interface Functionality | The actions of a successful flow; may include a sequence diagram; the number of the sequence action is mandatory.<br>    Create Object<br>        Authenticate User<br>. . . |
| Connectors & API Description | Adapter description, call sequence, data class definition, protocols |
| Involved Endpoints | Web services endpoints - production and testing differences |
| Integration Type | Fire and forget, sync, async, etc. |
| Configuration Link | In the tool, for the endpoint, for the adapter. |
| External system owner detail | Services contract, web services definition owner, support contacts |

Architecture Accelerator Description Template

An accelerator contributing to the overall architecture of a customer system and its platform architecture needs a description. Specialists deliver these accelerators. The architecture method detects where actions have to happen to increase the architecture pulse. The actions may lead to accelerators to deliver it.

We define an architecture accelerator as a transition from one architecture level of detail to another having certain qualities achieved—impacting architecture types. An example of an accelerator, e.g. an Architecture Accelerator Description Template, is shown below:

TABLE 24

Architecture Accelerator Description Template
Architecture Accelerator Description Template

| | |
|---|---|
| Description & Value | A description, summary of the accelerator<br>Value of the accelerator<br>Impact on the architecture - and expected pulse increase<br>Business outcome |
| Prerequisites | What is needed for the accelerator, customer eligibility<br>Customer prerequisites (platform, personnel, etc.)<br>Accelerator prerequisites |
| Architecture types | E.g. GTMA, . . . |
| Architecture type units | E.g. object model<br>Changes in architecture type unit details might be documented |
| Start level of detail | E.g. Feasible |
| End level of detail | E.g. Scheduled |
| Quality types achieved | Complete of A, B, C, etc. |
| Platform features enabled | Functional, e.g. feature in a new release of Marketing Cloud<br>Non-functional, e.g. new SSO or changed protocol like OData |
| Resources needed | People, skills - from the customer (platform owner) and from the delivery (partners)<br>Assets - like test setup, new sandbox - from the customer, from the delivery team |
| Duration | Timing aspects |
| Deliverables | On the platform (software artifacts, configuration, etc.)<br>For the operational model (run-the-cloud)<br>In the architecture description |
| Version | Accelerator status: like pilot, experimental, general available (GA), geographical conditions |

Method Tooling—Tooling Concept

Figure 9:
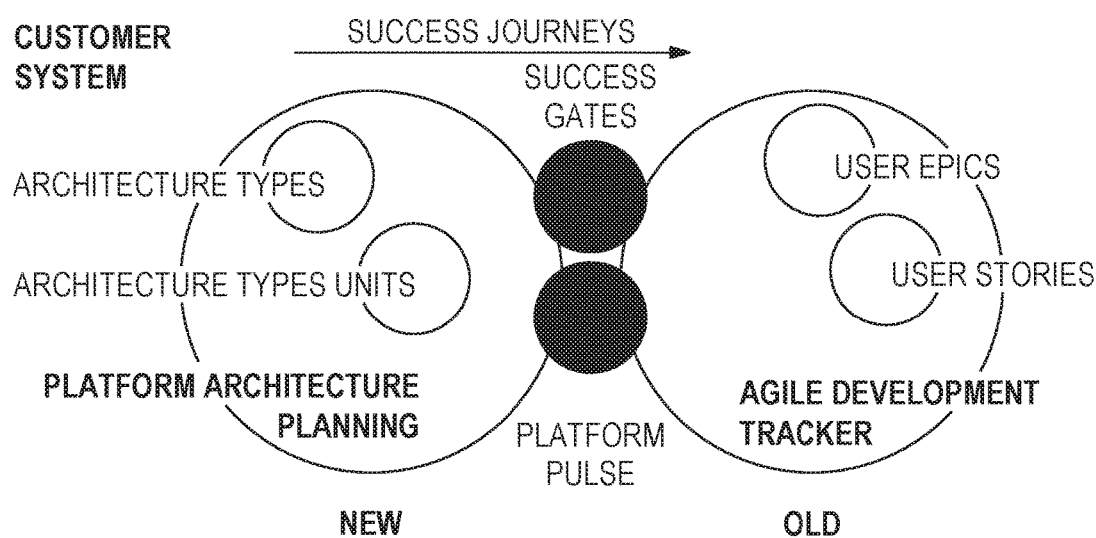
FIG. 9 is a diagram illustrating a comparison between the platform architecture planning process and a known agile development tracker.

Culture needs tooling. Different groups distinguish themselves also due to their tooling, e.g. in Hawaii the Chiefs have a special type of surfboard called Olo, because surfing is an impacting part of their culture. FIG. 9 is a diagram illustrating a comparison between the platform architecture planning process and a known agile development tracker.

We want to interface with the Salesforce Agile Accelerator (or alike) to incorporate architecture artifacts to create a product that supports platform architecture planning and development for a customer system in a holistic fashion in one tool—on the same instance where the planning is actually realized.

The user stories for architecture planning are used in the requirement engineering scope. The sprint management is not part of the architecture planning. The architecture planning shall steer and hence be incorporated into the sprint management.

The graphical tools, e.g. schema builder or journey builder might be incorporated into the architectural description artifacts.

We envision this as main tool for the collaboration of architects and engineers in a center of excellence.

Accounts in the CRM can be enhanced to include an architecture pulse, or the four architecture types to describe the maturity of the org from a technological way or health. This can be used to manage multiple orgs in an enterprise—for reselling and for ISV.

Knowledge shall be used to create additional architectural documentation, e.g. regulations. It shall augment the architecture artifacts with additional heuristics and expertise.

Success gates are essentially like sales process stages. The tracking of the architecture can have the same mechanic as a sales process.

Object-fields report as the data catalog for regulation shall be used. Metadata types might be added to add the customer journey ID for reporting—for traceability. The tooling API can be used to determine the existence of relevant architectural artifacts to determine architecture indicators.

Tooling will support the hierarchy of deliverables to document the architecture of the platform the architecture is for. For the Salesforce platform architecture the structure will be preconfigured based on the method outlined in this document

Methodology Features

We have described a methodology with the following features:

Platform architecture type definitions—as GTMA, PEA, PCA, and PIA, a frame of reference for customer system architectures Platform architecture planning process—as the enhancement of agile development tooling leveraging success gates Platform pulse definition—as a configurable, calibrated numerical measure of architectural maturity, e.g. on an account in a CRM Other possible features include: Salesforce platform artifact mapping to the architecture type units—based on Salesforce tooling API and metadata API as an automatic algorithm; Platform accelerator localization—as the success and value definition for an accelerator in an overall customer system and its platform architecture; and Platform architecture knowledge base—architecture guidance, exclusively for the architecture method user.

App Overview

The app guides and documents the architecture process and its architecture artifacts. It's structured into three main components:

A component handling all master data related information needed to describe the proposed architecture model and the mapping to the platform artifacts A component applying the defined rule set on combine captured information with provided master data A component handling the output after the rules applied.

Figure 10:
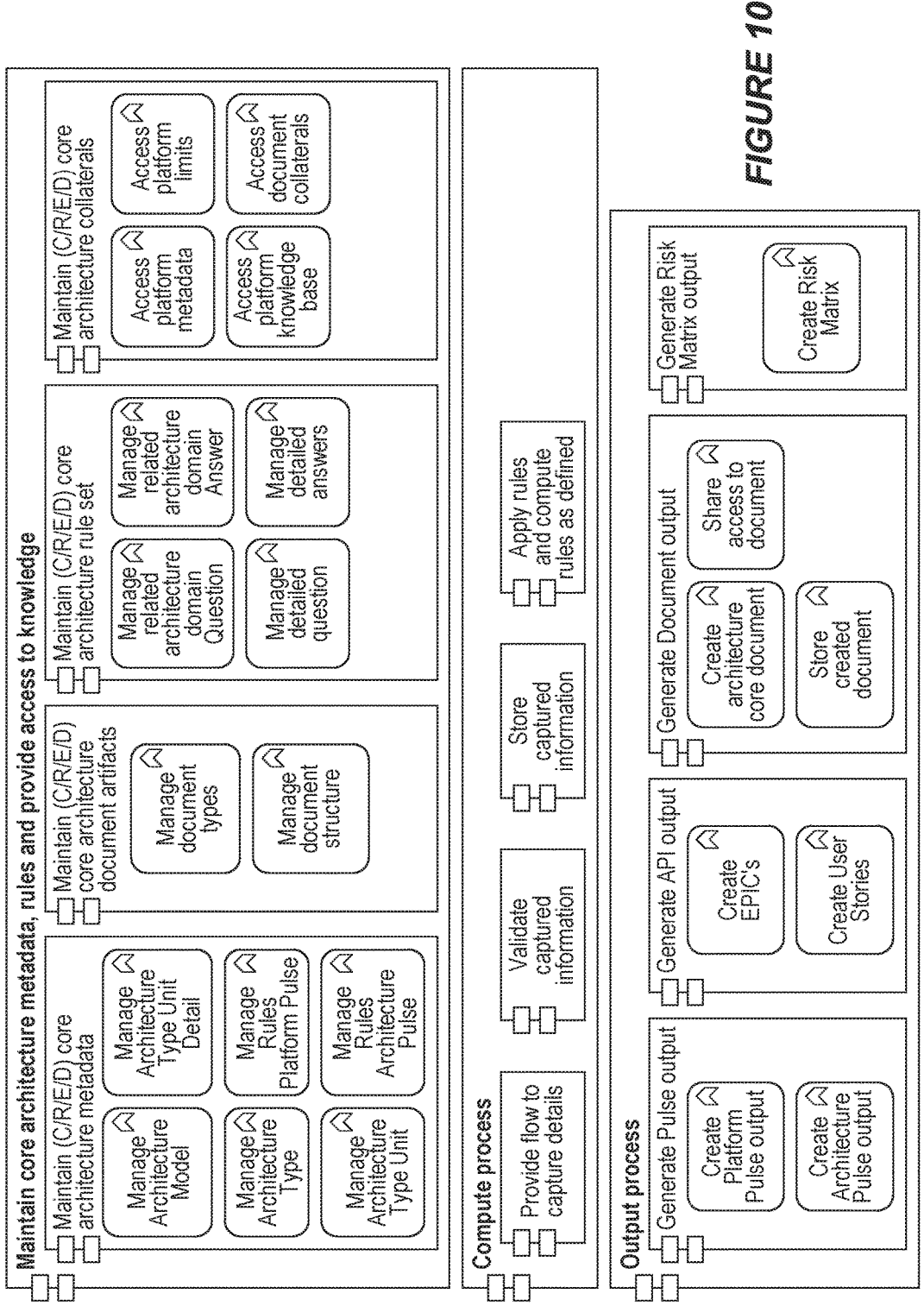
FIG. 10 is a block diagram illustrating processes for maintaining core rules and providing access to knowledge, process flow for captured information, and output process for architecture core documents.

FIG. 10 is a block diagram illustrating processes for maintaining core rules and providing access to knowledge, process flow for captured information, and output process for architecture core documents.

Why we are a Digital Customer System—and not Functional IT

"Digital in the context of IT is focused on creating a two-part environment that decouples legacy systems—which support critical functions and run at a slower pace—from those that support fast-moving, often customer-facing interactions. A key feature of digitized IT is the commitment to building networks that connect devices, objects, and people. This approach is embodied in a continuous-delivery model where cross functional IT teams automate systems and optimize processes to be able to release and iterate on software quickly." (McKinsey, What 'digital' really means, July 2015)

We focus on the architecture for speedy apps on a solid platform that connects to the customer system collecting all value co-creational aspects. Hence, our environment architecture empowers stakeholders to make solid decisions in a world of changing collaboration of customers and their products.

Hence, this makes the distinction between a system of engagement (for focusing on innovation and differentiation) and a system of record (as the legacy) unnecessary. The platform already implies systems of different pace: the platform gives the stability; products (apps) can be tactical, experimental, and fast changing—or value-add platform services that are stable, slow changing for reuse. The data on the platform can be the system of record, e.g. for customer data as a CRM or the basis for systems of engagement as a portfolio of products (apps).

Gartner states (Gartner, Forecast Overview: CRM Software Worldwide, August 2015):

CRM enables digital business.

The main drivers behind the hot topics in CRM—cloud, social, mobile and big data—are being joined by a fifth driver: the Internet of Things, where sensors connecting things to the Internet create new services previously not envisioned.

In 2018, 5% of customer service cases will be initiated by Internet-connected devices, from 0.02% in 2014.

Eighty-five percent of CRM projects used some form of commercially made and packaged-off-the-shelf CRM technology, and only 15% of new projects use custom-built solutions to deliver a business benefit.

The most common goals for CRM projects were to increase and improve: Customer satisfaction; Customer understanding; Sales person productivity; Cross-selling and upselling products and services; Marketing effectiveness; Customer acquisition; Cost to serve CRM project lengths range from 10 days to five years and average around 17 months because they are so varied, from the complex—such as altering compensation plans and corporate metrics—to the comparatively simple—such as quick fixes to the Web user experience.

A company will double its spending on additional CRM product modules within five years of the first purchase.

By 2020, new CRM spending for the midmarket-sized business will be almost 60% up from 54% in 2012. Large enterprise CRM spending will be 32% upfront 37% in 2012, while small business CRM spending will account for 9% (same as in 2012).

The customer system—as the goal of the architecture method—transforms CRM into a customer centric platform to effectively anticipate the environment, especially customer devices for effective go-to-market strategies.

Why we do Platform—and not Enterprise Architecture

Enterprise architecture sets the ongoing change at the end of its life cycle of an architecture model. The method incorporates the change right from the start, because markets drive change on an ongoing basis. That's why we might say "architecture" is given.

Enterprise architecture starts with the business architecture view of the users of the system. This falls back due the case that the method starts with the need and requirements of the market the corporation is part of and need to find answers. On top due intense technology, diverse regulations, and competitor moves this market is on an ongoing "flux". Therefore the method represent a more agile answer on the architecture side and is able to cover this fast changing environment with an included governance model, i.e. success gates.

The centralization of IT activities is based on a centralized platform with the Salesforce technology. The method defines customer centricity—and all other stakeholders are following: this is the customer system. Success journeys of customers (and their value for different customer types or personas) drive the scenarios of the customer system, not just use cases of subsystems.

Enterprise architecture information system architecture (comprising data and application architecture views) typically needs a definition of each layer like security, connectivity, etc. the method on the other hand is based on the thinking that the platform already provides these capabilities, but to what extent might be crucial. Validation of the model against a definitive technical capabilities of the platform ensures avoiding dead ends.

Enterprise architecture, e.g. TOGAF sees enterprise mobility as a single layer embodied in the core of the architecture; the method concentrates on the managing process of components (orchestrations) of business components in the hands of the user at the moment of execution. TOGAF does not know collaboration and communication using a social layer.

The "3rd Platform" is built on a foundation of cloud, mobile, social, and Big Data technologies. It will enable the all-important digital transformation, evolution, and expansion of every industry over the next several years and beyond. Business strategists, IT leaders, and solution developers are already conceiving and building disruptive new business and consumer services and business models, effectively reinventing their industries. (IDC, The 3rd Platform, November 2013)

Figure 11:
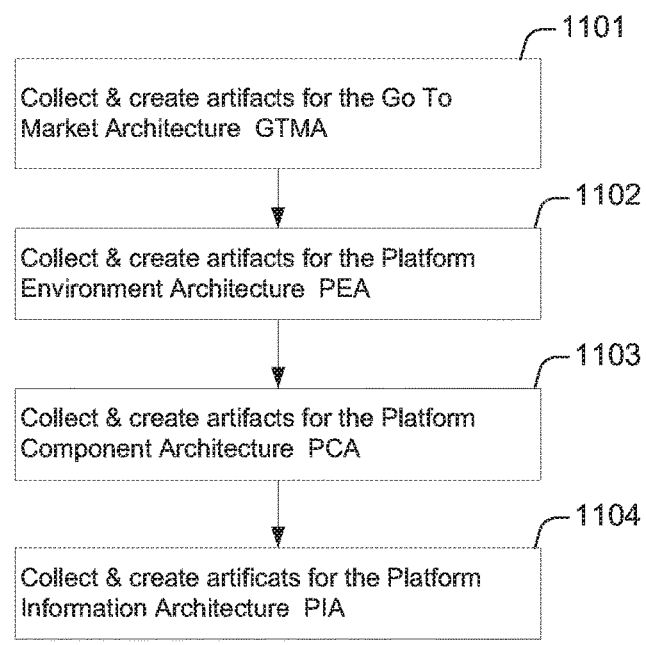
FIG. 11 is a flow diagram illustrating a process for management of architecture types.

FIG. 11 is a flow diagram illustrating a process for management of architecture types. In block 1101, artifacts for a first architecture type, e.g. the GTMA, are collected and created. In block 1102, artifacts for a second architecture type, e.g. the PEA, are collected and created. In block 1103, artifacts for a third architecture type, e.g. the PCA, are collected and created. In block 1104, artifacts for a fourth architecture type, e.g. the PIA, are collected and created.

Figure 12:
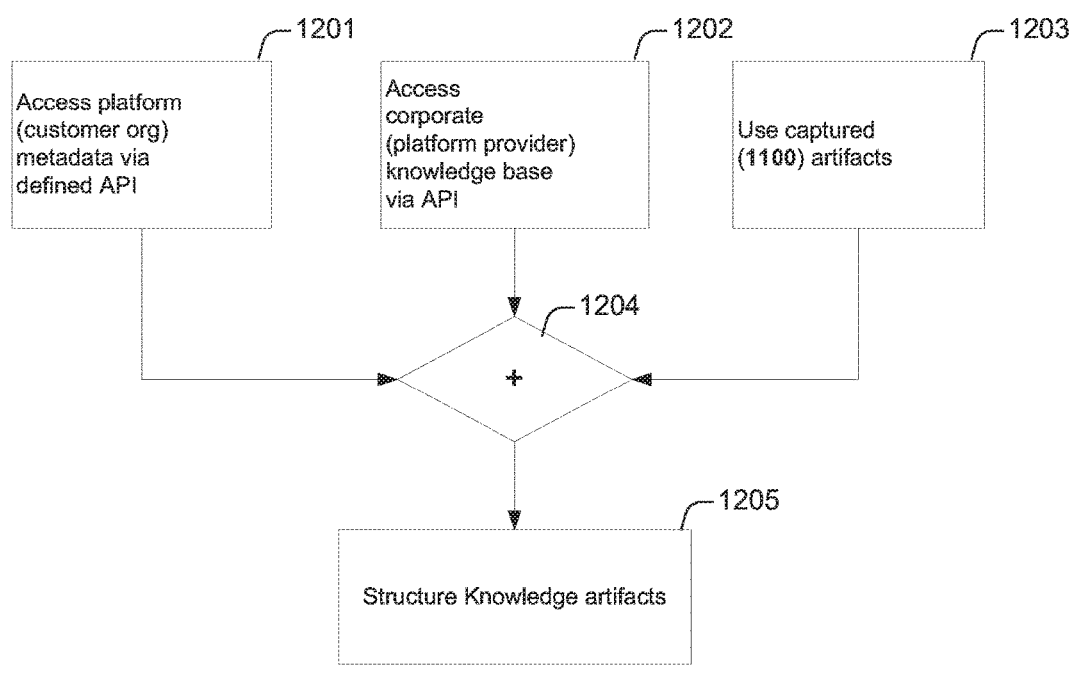
FIG. 12 is a flow diagram illustrating a process for managing knowledge artifacts.

FIG. 12 is a flow diagram illustrating a process for managing knowledge artifacts. In block 1201, a first component may access a platform (e.g. customer org) metadata via a defined API. This platform metadata is known and may include settings corresponding to salesforce metadata types, such as account settings (represents an organization's account settings for account teams, account owner report, and the View Hierarch link), action link group template (represents the action link group template—action link templates let you reuse action link definitions and package and distribute action links, which are buttons on a feed element), or the like, or combinations thereof.

In block 1202, a second component may access corporate (platform provider) knowledge base via API. In an example, the ATU details of the portfolio commercialization model ATU, e.g. business case, adoption concepts, or the like, or combinations thereof, may be defined in block 1202.

In block 1203, a third component may use captured artifacts. This may include customer feedback. Diamond 1204 refers to a parallel gateway. In block 1205, a fourth component may structure knowledge artifacts. This may include defining the ATU details for the architecture types.

In an example, answers to the deliverables, i.e. ATU details, may include system configurations (e.g. XML files), or other structured information. The customer system using the preexisting cloud-computing platform may be configured using these answers in an automatic or semiautomatic way.

Figure 13:
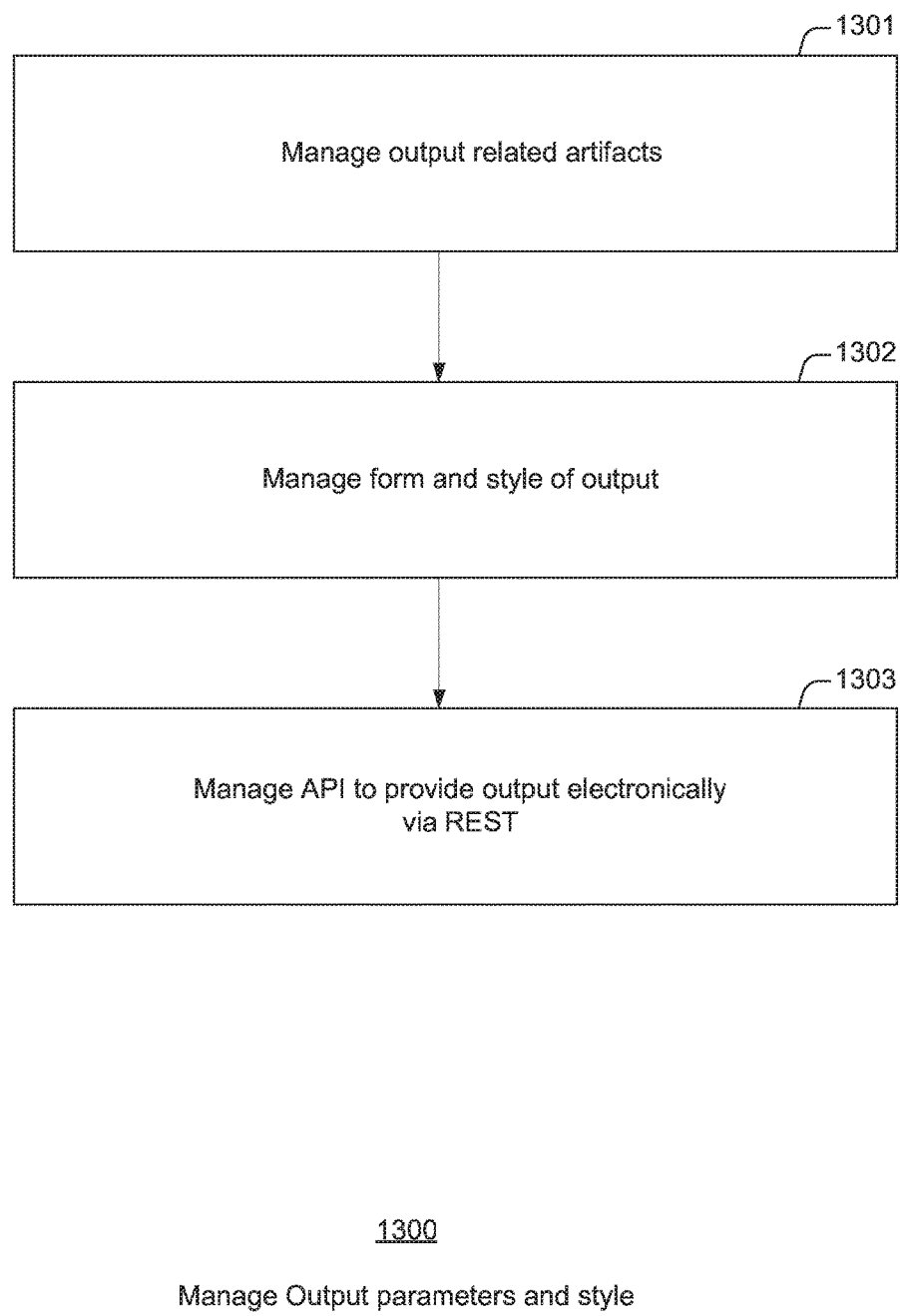
FIG. 13 is a flow diagram illustrating a process for managing output parameters and style.

FIG. 13 is a flow diagram illustrating a process for managing output parameters and style. In block 1301, output related artifacts may be managed. In block 1302, form and style of output may be managed. In block 1303, the API (Application Program Interface) to provide output electronically via REST (REpresentational State Transfer) may be managed. Outputs may include documents, links to knowledge, links to best practices, standard use cases to be implemented, programmatically setup of the platform directly, or the like, or combinations thereof.

Figure 14:
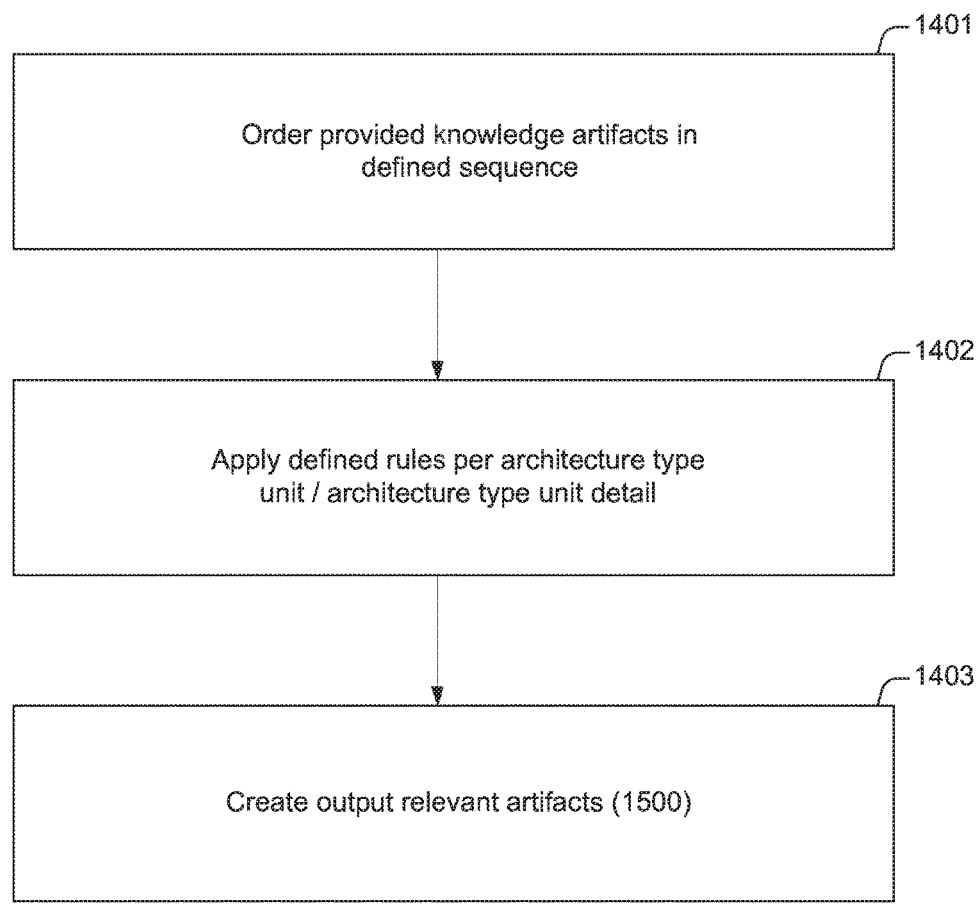
FIG. 14 is a flow diagram illustrating a process for applying provided knowledge artifacts.

FIG. 14 is a flow diagram illustrating a process for applying provided knowledge artifacts. In block 1401, knowledge artifacts may be ordered in a defined sequence. The sequence may be, with reference to Tables 13-16, generally based on completion of the ATU details in an order of left to right, and top to bottom.

In block 1402, defined rules may be applied per architecture type unit and/or architecture type unit detail. In block 1403, relevant artifacts may be output.

Figure 15:
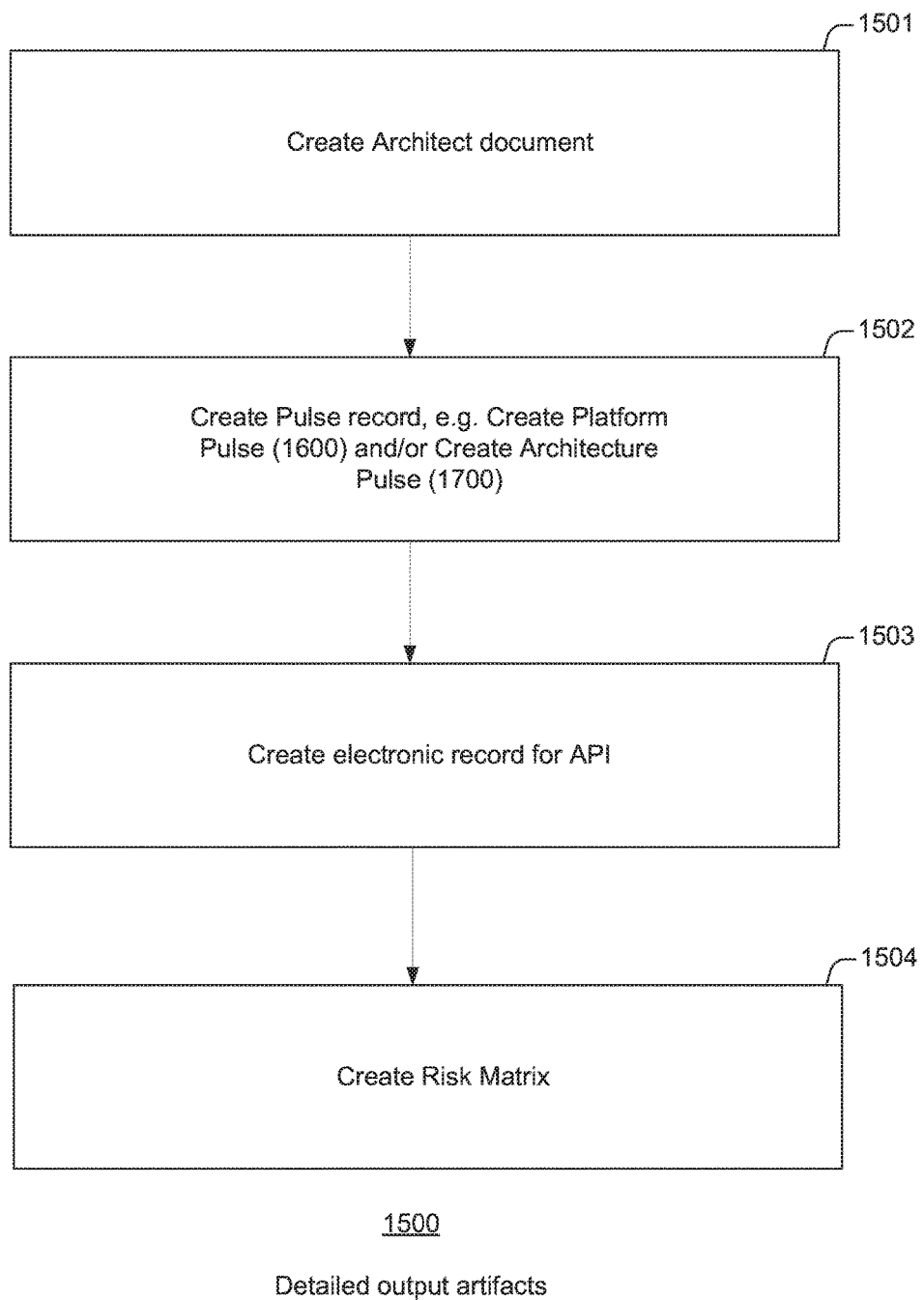
FIG. 15 is a flow diagram illustrating a process for detailing output artifacts.

FIG. 15 is a flow diagram illustrating a process for detailing output artifacts. There are known requirement management tools, which may be a target for detailing output artifacts. In block 1501, an architect document may be created. In block 1502, a platform pulse may be created. In block 1503, an electronic record for API may be created. In an example, an epic, a user story, or the like, or combinations thereof, may be included in the electronic record. In block 1504, a risk matrix may be created.

Figure 16:
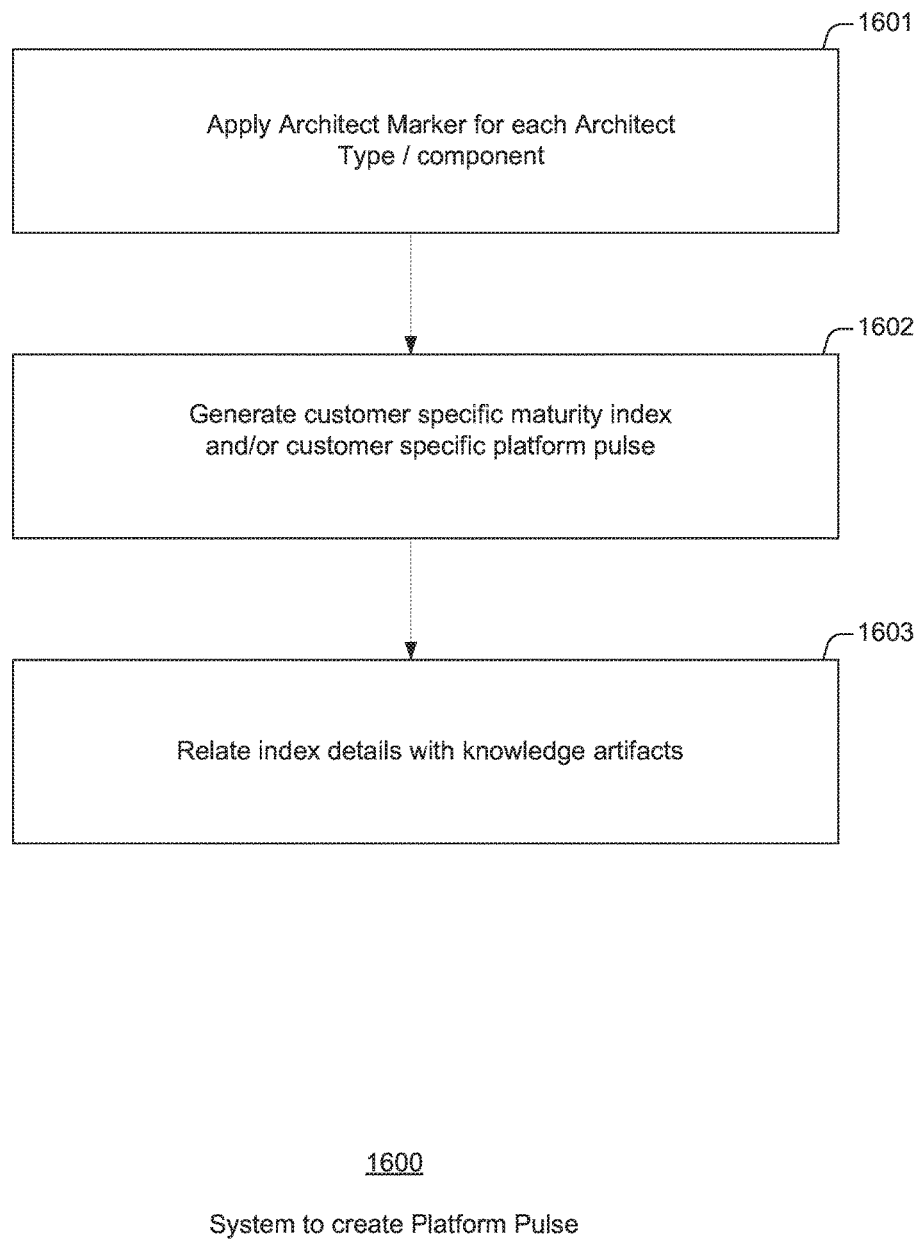
FIG. 16 is a flow diagram illustrating a process for creating a platform pulse.

FIG. 16 is a flow diagram illustrating a process for creating a pulse record, e.g. a platform pulse and/or an architecture pulse. In block 1601, an architect marker for each architect type and/or component may be applied. In block 1602, a customer specific maturity index and/or a customer specific platform pulse may be created. In block 1603, index details may be related with knowledge artifacts.

Figure 17:
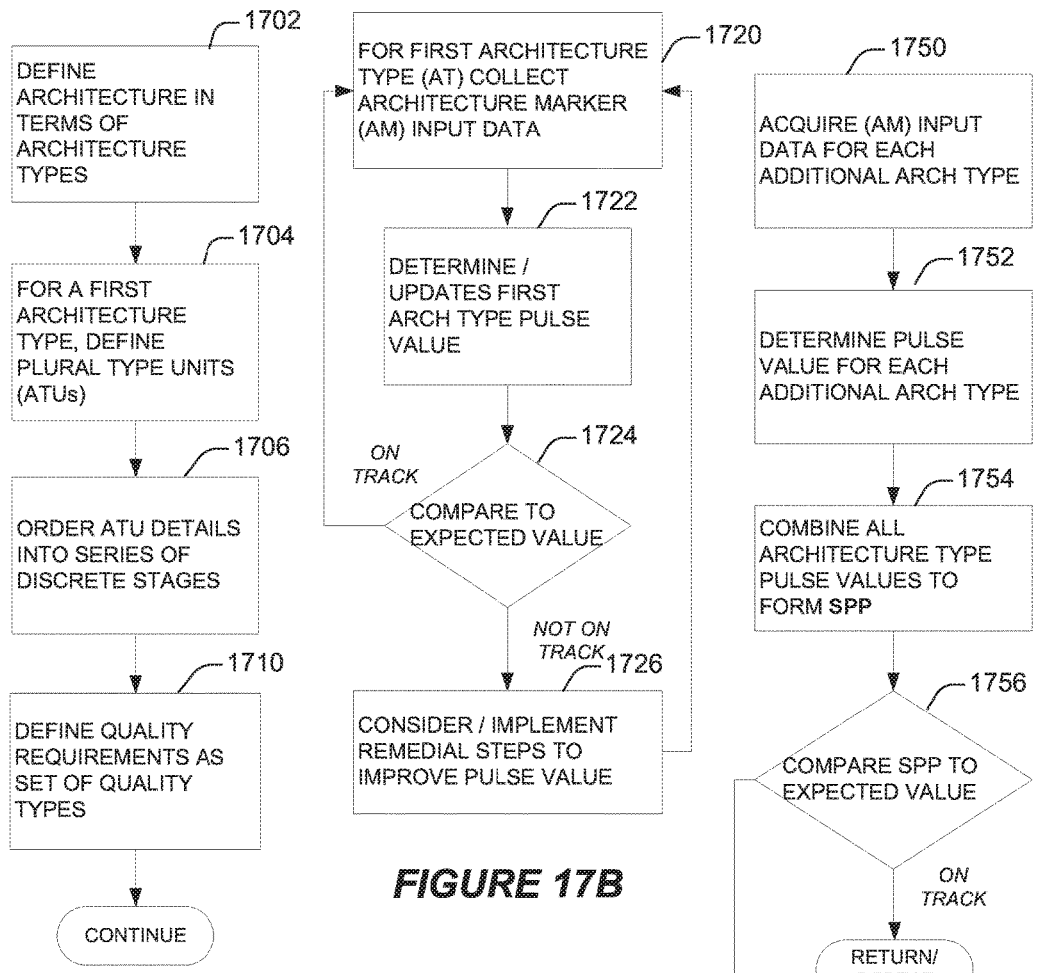
FIG. 17A is a simplified flow diagram illustrating preliminary aspects of an example of a method for measuring the architecting of a customer system during continuous delivery on a cloud-computing platform
FIGS. 17B-C are a simplified flow diagram illustrating an example of a method that builds on the preliminary steps of FIG. 17A.

FIG. 17A is a simplified flow diagram illustrating preliminary aspects of an example of a method for measuring the architecting of a customer system during continuous delivery on a cloud-computing platform. In one example the method includes defining a platform architecture of a customer system in terms of a plurality of architecture types, block 1702. For a given architecture type, the process may include defining of a plurality of architecture type units (ATUs) to further define and detail the architecture type, as described above, block 1704. In a preferred embodiment, each architecture type unit comprises a corresponding set of architecture type unit details (ATUD), sometimes called deliverables. The method further calls for ordering the ATU Details, block 1706, into a series of discrete stages (levels of detail) so that each architecture type unit detail (or deliverable) belongs to exactly one of the discrete stages of the corresponding architecture type. In a preferred embodiment, the series of discrete stages comprise at least four discrete stages; namely, Feasible, Preliminary, Detailed and Scheduled, in that order.

Without implying any particular order, a further step calls for defining a set of quality requirements for the deliverables. These requirements may be defined as a plurality of quality types, block 1710. These preliminary steps set the stage to enable measuring a status or maturity of the architecture as planning (and later realization) proceeds.

FIG. 17B is a simplified flow diagram illustrating an example of a method that builds on the preliminary steps of FIG. 17A. Here, the method calls for determining a current status (maturity) of a first architecture type as a first numeric pulse value, wherein the first pulse value combines a current status for each stage of the first architectural type, based on the defined quality requirements, together with a current level of detail of the of the first architectural type, based on the existing deliverables. In an embodiment, the method first calls for collecting architecture marker (AM) input data, block 1720. The input data may comprise an input matrix of the quality types and levels of detail for a given architecture type. For example, the input data comprising a binary indication, for each of the discrete stages, of whether or not all of the deliverables associated with the stage is considered confirmed, based on meeting the defined quality requirements. An example of an architecture marker (AM) is shown in FIG. 20. In block 1722 the method calls for determining or updating the architecture pulse value responsive to the architecture marker (AM) input data. The architecture pulse value preferably is a single number. It may be scaled to a range of 0 to 1 for easy reference.

In some embodiments, the method includes weighting the architecture marker input data by a set of selected atomic quality level weights. In some embodiments, the method includes weighting the architecture marker input data by a set of selected progressive weights. The weighting may be done by matrix calculations such as a sum-product to generate the pulse value. FIG. 21 shows an example of atomic quality and progressive weighting matrices. The atomic quality weighted and the progressive weighted input data may be combined in the determining step to arrive at the architecture type pulse value. The progressive coefficients or weights are selected to enforce a preference that the deliverables of a given architectural type be created in an order according to the series of discrete stages, for example, those defined in step 1706. This may include weighting the architecture marker input data by progressive level weights (PLW) that are selected to increase the pulse value responsive to creation of deliverables in the order corresponding to the series of discrete stages, and conversely to reduce the pulse value responsive to creation of the deliverables in an order inconsistent with series of discrete levels of detail stages.

Referring to decision 1724, the pulse value for a given architecture type may be compared to an expected value. For example, using a normalized range of 0 to 1, the pulse value vs. time may be expected to be at least 0.69 say 12 weeks into a project. An example is illustrated in FIG. 5, where a current pulse value, shown as a triangle, is shown in between and ideal curve and a worst case curve. This kind of graphic can be used to simply illustrate the current status of an architecture type or an entire architecture. The expected pulse value vs. time may vary depending on the project complexity, priority, budget, etc. If the pulse value is below the expected value, the project is not on track (at least the individual architecture type under consideration), and thus steps may be taken to improve the pulse value and get things back on track, block 1726. Conversely, if the current pulse value meets or exceeds the expected value, the process of FIG. 17B may loop back to block 1720 to receive updated input data, and repeat the process, thus keeping track as planning the customer architecting the customer system progresses.

Turning to FIG. 17C, block 1750 calls for acquiring AM input data for each additional architecture type of the defined architecture. In block 1752, a corresponding pulse value is determined for each additional architecture type in the manner described above. In an example, the method includes repeating the step of defining of a plurality of architecture type units (ATUs), wherein each of the architecture type units comprises a corresponding set of architecture type unit detail (ATUD) deliverables, for each of the additional architecture types.

Referring now to block 1754, the method may include combining the respective architecture pulse values of all of the plural architecture types to form a single success platform pulse (SPP) numeric value that reflects a current status of the customer system platform. In some embodiments, the method may include forming a success platform pulse (SPP) of the customer system as a weighted average of the plural architecture pulse (AP) values; and it may include displaying the SPP to enable tracking an overall condition of platform architecture of the customer system with a single numerical value.

Figure 18:
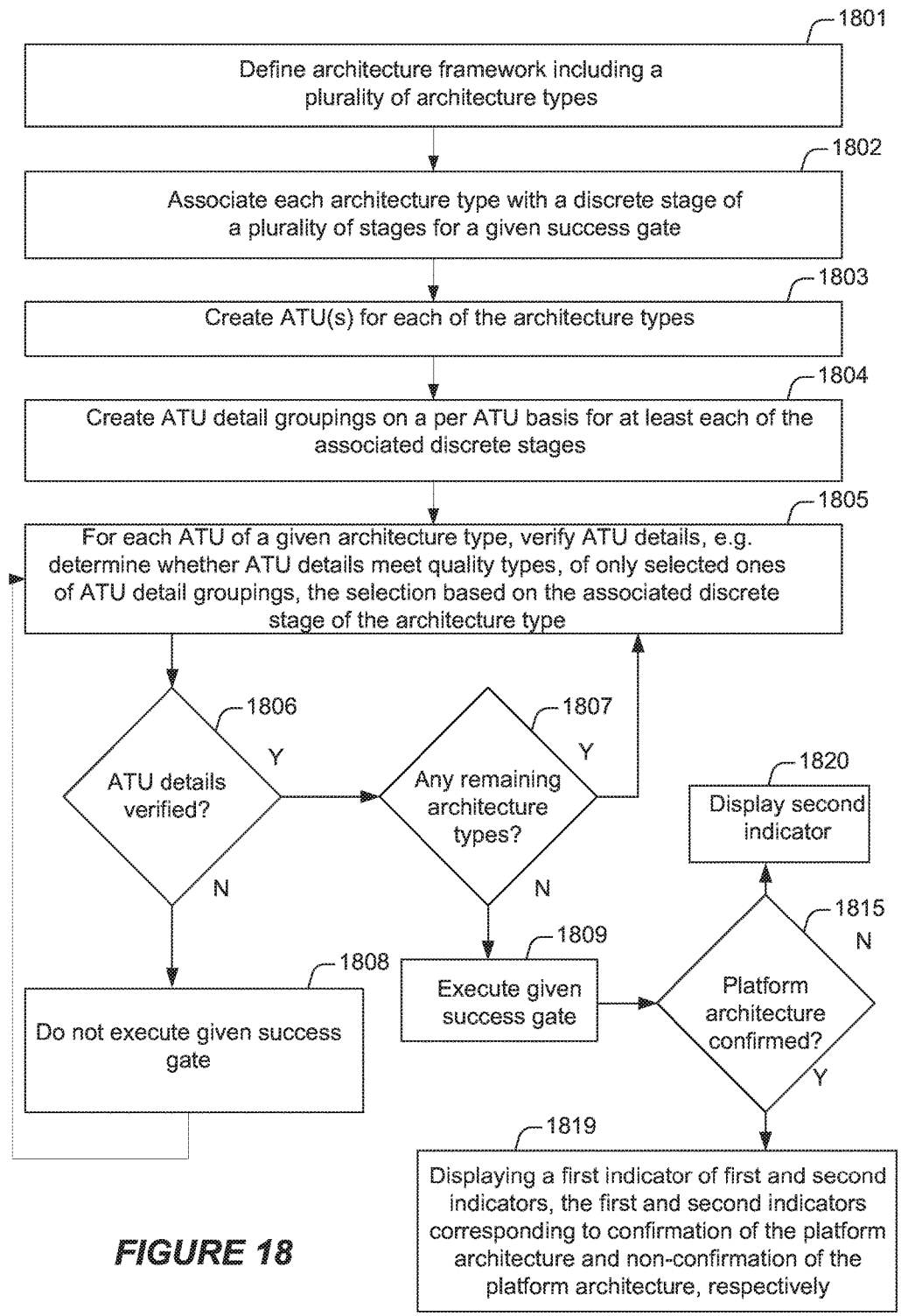
FIG. 18 is a flow diagram illustrating a process for developing a customer platform architecture utilizing a preexisting cloud-computing platform.

Referring to decision 1756, it illustrates comparing the SPP to an expected value. In the case that the SPP is below the selected value, block 1760 refers to remedial steps to improve the SPP pulse value. For example, this step may involve identifying one of the architecture types having the lowest architecture pulse value; for the identified one architecture type, examining the underlying individual pulse values; and, based on the underlying individual pulse values, identifying at least one of the architecture type units (ATUs) associated with the identified architecture type; and applying resources to the identified ATU to increase the SPP. In some cases, the method may include, for the identified lagging architecture type, examining the underlying individual pulse values; based on the underlying individual pulse values, identifying at least one set of the corresponding architecture type unit detail (ATUD) deliverables; and applying an accelerator to create or improve the quality of the identified deliverables to increase the SPP FIG. 18 is a flow diagram illustrating a process for developing a customer platform architecture utilizing a preexisting cloud-computing platform. In block 1801, an architecture type including a plurality of architecture types may be defined. In block 1802, each architecture type may be associated with a discrete stage of a plurality of stages for a given success gate. One example of such an association is shown in Table 11. In block 1803, ATU(s) for each of the architecture types may be created. In block 1804, ATU details may be created on a per ATU basis for at least each of the associated discrete stages.

In block 1805, for each ATU of a given architecture type, ATU details of only selected ones of ATU detail groupings may be verified. In an example, verification may include determining whether the quality types are met for the ATU details. The selection may be based on the associated discrete stage of the given architecture for the given success gate. If the ATU details of the selected ones of the ATU detail groupings are not all verified, in diamond 1806, then in block 1808 the given success gate may not be executed, and another verification may be attempted.

If the ATU details of the selected ones of the ATU detail groupings are all verified in diamond 1806, then in diamond 1807 if there is another architecture type remaining, block 1805 may be repeated.

Once the ATU details of the selected ones of the ATU detail groupings for all architecture types have been verified, then in block 1809 the given success gate may be executed. If the platform architecture is confirmed, e.g. if all the architecture types are confirmed, then in block 1819 a first indicator of first and second indicators corresponding to confirmation of the platform architecture and non-confirmation of the platform architecture, respectively, may be displayed. These first and second indicators may correspond to the go-no-go decision. Otherwise, in block 1820 the second indicator may be displayed.

In an example, a method for developing a customer system utilizing a preexisting cloud-computing platform is provided. The method may include defining a platform architecture for the customer system to be developed in terms of a plurality of architecture types. The architecture types may include a first architecture type that receives input corresponding to a first customer value view artifact, the first architecture type associated with first Architecture Type Units (ATUs), each first ATU associated with N groupings of first ATU details, each first ATU detail grouping including at least one ATU detail and a second architecture type that is different than the first architecture type, the second architecture type associated with second ATUs, each second ATU associated with N groupings of second ATU details, each second ATU detail grouping including at least one ATU detail. Every ATU detail grouping for a given ATU may correspond to a different one of N discrete stages, each discrete stage corresponding, respectively, to a different level of detail including a first level through an $N^{th}$ level.

The method may also include verifying an ATU detail of a first or second ATU detail grouping corresponding to a discrete stage an $M^{th}$ level of detail for a given success gate of a plurality of success gates, the ATU detail corresponding to one of the first or second architecture types. In response to not verifying the ATU detail, the success gate may not be executed.

In an example, the method may include verifying an ATU detail of a first or second ATU detail grouping corresponding to a discrete stage of an $I^h$ level of detail of the other one of the first or second architecture types. Following verification of the ATU details for the $M^{th}$ level of detail and the $I^{th}$ level of detail, the success gate may be executed.

In an example, I does not equal M such that the determinations are based on different ones of the discrete stages. In an example, M does not equal N such that the determination is based on only a subset of the ATU details of the first or second ATU detail groupings. In an example, M is greater than one, and the method may include verifying all the ATU details of more than one of the discrete stages, including the ATU details of the discrete stage corresponding to the $M^{th}$ level and every discrete stage that corresponds to a level less than the $M^{th}$ level.

In an example, the second architecture may be a platform environment, component architecture, or information architecture. In an example, the discrete stages may include feasible, preliminary, detailed, and scheduled.

In an example, verification may include determining whether quality requirements are met for the ATU detail. In an example, a quantity of the quality requirements is equal to N. In an example, the quality requirements may include concrete, consistent, complete, and compliant.

In an example, the method may include creating an architecture template for each of the architecture types of the plurality of architecture types. The template may include an architecture type name value and a value to list the corresponding ATUs. In an example, each architecture template may include an architecture type definition value. In an example, each architecture template may include a success platform pulse value. In an example, each architecture template may include a success architecture decision value.

In an example, the first architecture type comprises N aspects, namely componentization, connectivity, configuration, and constraints. Each of the aspects of each architecture type may be described by a corresponding one of the first ATUs. In an example, the second architecture type may be associated with N aspects, namely componentization, connectivity, configuration, and constraints. Each of the aspects of each architecture type may be described by a corresponding one of the second ATUs.

Figure 19:
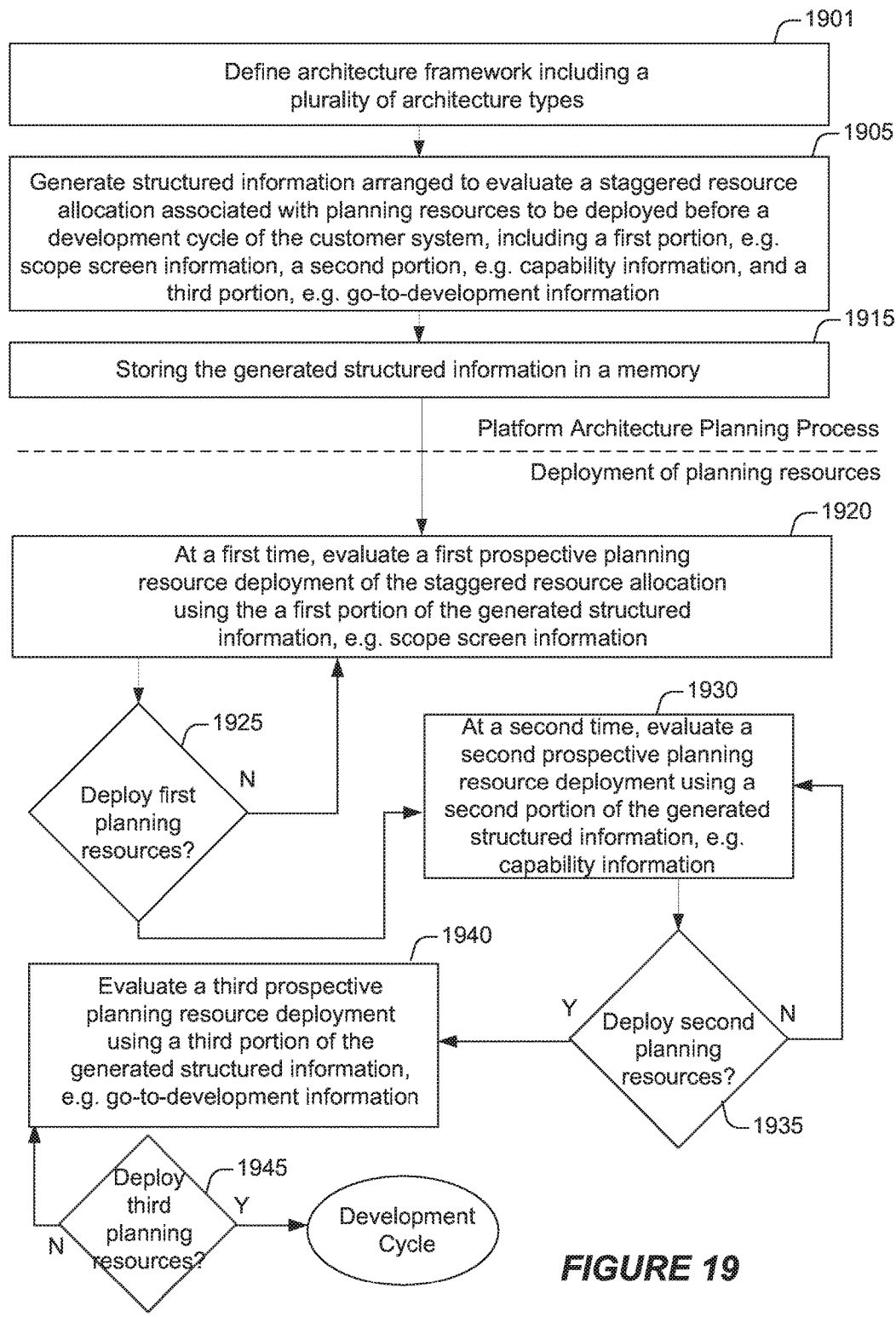
FIG. 19 is a flow diagram illustrating a process for generating information arranged to evaluate planning resource allocation prior to a development cycle of a customer system utilizing the preexisting cloud-computing platform.

FIG. 19 is a flow diagram illustrating a process for generating information arranged to evaluate planning resource allocation prior to a development cycle of a customer system utilizing the preexisting cloud-computing platform.

The first three success gates (scope, capability, and go-to-development) are executed in order to prepare for the actual development (the third gate is go-to-development). These first three gates are for planning, and the resources applied in order to execute these gates are referred to herein as planning resources, i.e. resources expended to create and/or assess the platform architecture (contrast with development resources, i.e. resources for realization or implementation of the customer system based on the platform architecture).

In block 1901, an architecture type including a plurality of architecture types may be defined. It should be appreciated that, together with, before, or after process 1901, any portion of the previously described processes, including but not limited to processes of blocks 1802, 1803, and 1804 (FIG. 18), may be performed.

In block 1905, structured information arranged to evaluate a staggered resource allocation associated with planning resources to be deployed before a development cycle of the customer system. In an example, the generated structured information includes a first portion, e.g. scope screen information, a second portion, e.g. capability information, and a third portion, e.g. go-to-development information.

In an example, the scope screen information may define a first subset of the ATU details of the architecture types. In an example, the first subset may include all the ATU details of a first quantity of the first ATU detail groupings and all the ATU details of a second quantity of the second ATU detail groupings. The second quantity may be less than the first quantity. This should be appreciated from information in Table 11, where the level of detail for the PEA, PCA, and PIA architecture types is less than (on the scale—feasible, preliminary, detailed, scheduled) than the level of detail for the GTMA architecture type.

In an example, the capability information may define a second subset of the ATU details. In an example, the second subset may include all the ATU details of the first subset and at least all the ATU details of one additional ATU grouping for each architecture type, e.g. one additional first ATU grouping and/or one additional second ATU grouping. This should be appreciated from information in Table 11, where the level of detail for each architecture type for S2 is greater than the level of detail for each architecture type in S1.

In an example, the go-to-development information may define a third subset including all the ATU details of the second third subset and an additional ATU detail. This should be appreciated from information in Table 11, wherein S3 may include an additional ATU detail with respect to S2, e.g. an additional ATU detail of the architecture types PEA and PCA.

In block 1915, the generated structured information may be stored, for example, in a memory device such as an electronic memory.

After planning, in the development cycle, the structured information generated during planning may be utilized for assessment. In block 1920, at a first time, a first prospective deployment of the staggered resource allocation may be evaluated. The evaluation may utilize the first portion of the generated structured information from planning. If the first planning resources are not deployed after the evaluation/assessment in diamond 1925, then another evaluation may be performed at a later time.

After the first resource is deployed, in block 1930, at a second later time, a second prospective deployment of the staggered resource allocation may be evaluated. The evaluation may utilize the second portion of the generated structured information from planning. If the second resource is not deployed after the evaluation/assessment in diamond 1935, then another evaluation may be performed at a later time.

After the second resource is deployed, in block 1940, at a third later time, a third prospective deployment of the staggered resource allocation may be evaluated. The evaluation may utilized the third portion of the generated structured information from planning. If the third resource is not deployed after the evaluation/assessment in diamond 1945, then another evaluation may be performed at a later time.

After the third resource is deployed, a development cycle may be initiated. Development resources may be deployed during the development cycle.

In an example, a method for developing a customer system utilizing a preexisting cloud platform is provided. The method may include defining a platform architecture for the customer system to be developed in terms of a plurality of architecture types. The architecture types may include a first architecture type that receives input corresponding to a first customer value view artifact. The first architecture type may be associated with first Architecture Type Units (ATUs). The second architecture type may be associated with second ATUs.

The method may include generating structured information arranged to evaluate a staggered resource allocation associated with planning resources to be allocated before a development cycle of the customer system. Generating the structured information may include linking each ATU detail of a first plurality of ATU details with a particular one of the ATUs to create first ATU detail groupings, every one of which corresponds to a different level of detail, and second ATU detail groupings, every one of which corresponds to a different one of the levels of detail. Each first ATU detail grouping may be associated with the first architecture type and may include at least one of the ATU details. Each second ATU detail grouping may be associated with the second architecture type, and may include at least one of the ATU details. The generated structured information may be stored in a memory.

In an example, the structured information may include scope screen information, the scope screen information defining a first subset of the ATU details, the first subset including all the ATU details of a first quantity of the first ATU detail groupings and all the ATU details of a second quantity of the second ATU detail groupings. The second quantity may be less than the first quantity. In an example, the structured information may include capability information, the capability information defining a second subset of the ATU details, the second subset including all the ATU details of the first subset and at least all the ATU details of at least one of an additional first ATU detail grouping or an additional second ATU detail grouping. In an example, the structured information may include go-to-development information, the go-to-development information including all the ATU details of a third subset of the ATU details, the third subset including all the ATU details of the second subset and at least one additional ATU detail.

In an example, the method may include evaluating a first prospective planning resource deployment of the staggered resource allocation using the scope screen information of the generated structured information. In an example, the method may include evaluating a second prospective planning resource deployment using the capability information of the generated structured information. This evaluation may be after a time of deployment of a planning resource corresponding to the first prospective planning resource deployment. In an example, the method may include evaluating a third prospective planning resource deployment using the go-to-development information of the generated structured information. This evaluation may be after a time of deployment of a planning resource corresponding to the second prospective planning resource deployment. In an example, the method may include deploying development resources. This deployment of the development resources may be after a time of deployment of a planning resource corresponding to the third prospective planning resource deployment.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing system may execute instructions or "code" stored in memory. The memory may store data as well. The processing system may include, but may not be limited to, an analog processor, a digital processor, a microprocessor, a multi-core processor, a processor array, a network processor, or the like. The processing system may be part of an integrated control system or system manager, or may be provided as a portable electronic device configured to interface with a networked system either locally or remotely via wireless transmission.

The processor memory may be integrated together with the processing system, for example RAM or FLASH memory disposed within an integrated circuit microprocessor or the like. In other examples, the memory may comprise an independent device, such as an external disk drive, a storage array, a portable FLASH key fob, or the like. The memory and processing system may be operatively coupled together, or in communication with each other, for example by an I/O port, a network connection, or the like, and the processing system may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing system.

Operating instructions or commands may be implemented or embodied in tangible forms of stored computer software (also known as "computer program" or "code"). Programs, or code, may be stored in a digital memory and may be read by the processing system. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing system. The term "computer-readable" may not be limited to the historical usage of "computer" to imply a complete mainframe, mini-computer, desktop or even laptop computer. Rather, "computer-readable" may comprise storage medium that may be readable by a processor, a processing system, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for measuring the architecting of a customer system during continuous delivery on a cloud-computing platform, the method comprising:
    defining and developing, by a computer system, a platform architecture of a customer system in terms of a plurality of architecture types, the architecture types including a first architecture type that is a Go-To-Market Architecture (GTMA) that documents how the customer system will address a customer's business model;
    for the first architecture type, defining, by the computer system, a plurality of first architecture type units (ATUs) to further define and detail the first architecture type, wherein each of the first architecture type units comprises a corresponding set of architecture type unit detail (ATUD) deliverables;
    for each of the first architecture type units, ordering, by the computer system, the deliverables into a series of discrete stages (levels of detail) so that each deliverable belongs to exactly one of the discrete stages of the first architecture type;
    defining, by the computer system, a set of quality requirements for the deliverables;
    determining, by the computer system, a current status of the first architecture type as a first architecture pulse (AP) value, wherein the first pulse value combines a current status for each stage of the first architectural type, based on the defined quality requirements, together with a current level of detail of the of the first architectural type, based on the existing deliverables; and wherein the first pulse also reflects a preference that the deliverables of the first architectural type be created in an order according to the series of discrete stages; and
    generating structured information to evaluate a staggered resource deployment associated with planning resources to be allocated before a development cycle of the customer system.

2. The method of claim 1, further comprising:
    for the first architecture type, receiving an architecture marker (AM) as input data, the input data comprising a binary indication, for each of the discrete stages, of whether or not all of the deliverables associated with the stage are considered confirmed, based on meeting the defined quality requirements, wherein the AM is a juxtaposition of progress and quality tracking, and wherein determining the current status of the first architecture type is responsive to the architecture marker (AM) input data.

3. The method of claim 2, wherein determining the current status of the first architecture type includes:
    weighting the architecture marker input data by a set of selected atomic quality level weights;
    weighting the architecture marker input data by a set of selected progressive weights; and
    combining the atomic quality weighted input data and the progressive weighted input data to arrive at the first pulse value for combined progress and quality tracking.

4. The method of claim 3, further comprising normalizing the first pulse value to a range of 0 to 1.

5. The method of claim 2, further comprising:
    for each remaining architecture type from the plurality of architecture types that is not the first architecture type, repeating the step of defining of a plurality of architecture type units (ATUs), wherein each of the architecture type units comprises a corresponding set of architecture type unit detail (ATUD) deliverables; and for each of the remaining architecture types, repeating the determining step to form corresponding architecture pulse (AP) values.

6. The method of claim 5, further comprising:
combining the respective architecture pulse values of all of the plurality of architecture types to form a single success platform pulse (SPP) numeric value that reflects a current status of the customer system platform.

7. The method of claim 5, further comprising:
forming a success platform pulse (SPP) of the customer system as a weighted average of the plural architecture pulse (AP) values; and
displaying the SPP to enable tracking an overall condition of platform architecture of the customer system with a single numerical value.

8. The method of claim 2, wherein the plurality of architecture types further include one or more of:
a platform environment architecture (PEA) type that reflects input from at least an API model artifact and documents how the customer system will address a model of the customer's services;
a platform component architecture (PCA) type that reflects input from a journey map artifact and documents or reflects how the platform is structured to execute the customer's processes; and
a platform information architecture (PIA) type that receives input from at least an object model artifact and is arranged to address customer data and document how platform persistency is organized.

9. The method of claim 2, wherein determining the current status of the first architecture type includes:
weighting the architecture marker input data by progressive level weights (PLW) that are selected to increase the pulse value responsive to creation of deliverables in an order corresponding to the series of discrete stages, and conversely to reduce the pulse value responsive to creation of the deliverables in an order inconsistent with series of discrete levels of detail stages; and
weighting the architecture marker by a quality level weight matrix (QLW) that recognizes a current stage of the architecture type unit details documenting a quality of the architecture.

10. The method of claim 2, further comprising:
receiving individual binary pulse values for all atomic stages, the atomic stages comprising, for each of the discrete stages, an binary indication of compliance relative to each quality type of the set of quality requirements, wherein determining the current status of the first architecture type is based on the individual binary pulse values.

11. The method of claim 10, wherein determining the current status of the first architecture type includes:
for each of the architecture types, forming an architecture pulse (AP) metric as a sum product of all of the individual pulse values and a selected pulse weight factor (PW) matrix to form a single numerical value representing a current condition of the corresponding architecture type;
forming a success platform pulse (SPP) of the customer system as a weighted average of the four architecture pulse (AP) values; and
displaying the SPP to enable tracking the overall condition of platform architecture of the customer system with a single numerical value.

12. The method of claim 11, further comprising:
comparing the SPP to an expected value;
in the case that the SPP is below the selected value, identifying one of the architecture types having a lowest architecture pulse value;
for the identified one architecture type, examining the architecture marker (AM) and the architecture type units (ATUs) associated with the identified architecture type; and
based on the examination of the AM and ATUs, applying resources to the identified ATU to increase the SPP by improving the architecture type unity details (ATUD) thereby increasing quality of the identified level of detail (stage) as an input for a revised exit of a success gate.

13. The method of claim 11, further comprising:
comparing the SPP to an expected value;
in the case that the SPP is below the selected value, identifying one of the architecture types having a lowest architecture pulse value;
for the identified one architecture type, examining the underlying individual pulse values;
based on the underlying individual pulse values, identifying at least one set of the corresponding architecture type unit detail (ATUD) deliverables; and
applying a potential architecture accelerator to create or improve the quality of the identified deliverables to increase the SPP.

14. A computer system for measuring the architecting of a customer system during continuous delivery on a cloud-computing platform, the computer system comprising:
a processor; and
memory coupled to the processor and storing instructions that, when executed by the processor, cause the computer system to perform operations comprising:
defining and developing a platform architecture of a customer system in terms of a plurality of architecture types, the architecture types including a first architecture type that is a Go-To-Market Architecture (GTMA) that documents how the customer system will address a customer's business model;
for the first architecture type, defining a plurality of first architecture type units (ATUs) to further define and detail the first architecture type, wherein each of the first architecture type units comprises a corresponding set of architecture type unit detail (ATUD) deliverables;
for each of the first architecture type units, ordering the deliverables into a series of discrete stages (levels of detail) so that each deliverable belongs to exactly one of the discrete stages of the first architecture type;
defining a set of quality requirements for the deliverables;
determining a current status of the first architecture type as a first architecture pulse (AP) value, wherein the first pulse value combines a current status for each stage of the first architectural type, based on the defined quality requirements, together with a current level of detail of the of the first architectural type, based on the existing deliverables; and wherein the first pulse also reflects a preference that the deliverables of the first architectural type be created in an order according to the series of discrete stages; and
generating structured information to evaluate a staggered resource deployment associated with planning resources to be allocated before a development cycle of the customer system.

15. The system of claim 14, wherein the memory further stores instructions for causing the computer system to perform operations comprising:

for the first architecture type, receiving an architecture marker (AM) as input data, the input data comprising a binary indication, for each of the discrete stages, of whether or not all of the deliverables associated with the stage are considered confirmed, based on meeting the defined quality requirements, wherein the AM is a juxtaposition of progress and quality tracking, and wherein determining the current status of the first architecture type is responsive to the architecture marker (AM) input data.

16. The system of claim 15, wherein determining the current status of the first architecture type includes:

weighting the architecture marker input data by a set of selected atomic quality level weights;

weighting the architecture marker input data by a set of selected progressive weights; and combining the atomic quality weighted input data and the progressive weighted input data to arrive at the first pulse value for combined progress and quality tracking.

17. The system of claim 15, wherein the memory further stores instructions for causing the computer system to perform operations comprising:

for each remaining architecture type from the plurality of architecture types that is not the first architecture type, repeating the step of defining of a plurality of architecture type units (ATUs), wherein each of the architecture type units comprises a corresponding set of architecture type unit detail (ATUD) deliverables; and for each of the remaining architecture types, repeating the determining step to form corresponding architecture pulse (AP) values.

18. The system of claim 17, wherein the memory further stores instructions for causing the computer system to perform operations comprising:

combining the respective architecture pulse values of all of the plurality of architecture types to form a single success platform pulse (SPP) numeric value that reflects a current status of the customer system platform.

19. The system of claim 17, wherein the memory further stores instructions for causing the computer system to perform operations comprising:

forming a success platform pulse (SPP) of the customer system as a weighted average of the plural architecture pulse (AP) values; and displaying the SPP to enable tracking an overall condition of platform architecture of the customer system with a single numerical value.

20. A non-transitory computer-readable medium storing instructions that, when executed by a computer system, cause the computer system to perform operations comprising:

defining and developing a platform architecture of a customer system in terms of a plurality of architecture types, the architecture types including a first architecture type that is a Go-To-Market Architecture (GTMA) that documents how the customer system will address a customer's business model;

for the first architecture type, defining a plurality of first architecture type units (ATUs) to further define and detail the first architecture type, wherein each of the first architecture type units comprises a corresponding set of architecture type unit detail (ATUD) deliverables;

for each of the first architecture type units, ordering the deliverables into a series of discrete stages (levels of detail) so that each deliverable belongs to exactly one of the discrete stages of the first architecture type;

defining a set of quality requirements for the deliverables;

determining a current status of the first architecture type as a first architecture pulse (AP) value, wherein the first pulse value combines a current status for each stage of the first architectural type, based on the defined quality requirements, together with a current level of detail of the of the first architectural type, based on the existing deliverables; and wherein the first pulse also reflects a preference that the deliverables of the first architectural type be created in an order according to the series of discrete stages; and generating structured information to evaluate a staggered resource deployment associated with planning resources to be allocated before a development cycle of the customer system.

* * * * *